US012293637B2

(12) United States Patent
Caputo et al.

(10) Patent No.: US 12,293,637 B2
(45) Date of Patent: May 6, 2025

(54) GAMING SYSTEMS, GAMING DEVICES AND METHODS WITH VOLATILITY CONTROL GAMES

(71) Applicant: IGT, Las Vegas, NV (US)

(72) Inventors: Scott A. Caputo, Santa Clara, CA (US); Ernie M. Lafky, San Francisco, CA (US); Bryan D. Wolf, Reno, NV (US); Paulina Rodgers, Reno, NV (US); Cameron A. Filipour, Las Vegas, NV (US); Adam M. Meyer, Reno, NV (US); Adam M. Singer, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 18/415,332

(22) Filed: Jan. 17, 2024

(65) Prior Publication Data

US 2024/0153351 A1 May 9, 2024

Related U.S. Application Data

(60) Continuation of application No. 17/032,917, filed on Sep. 25, 2020, now Pat. No. 11,935,359, which is a (Continued)

(51) Int. Cl.
*G07F 17/34* (2006.01)
*G07F 17/32* (2006.01)

(52) U.S. Cl.
CPC .......... *G07F 17/3258* (2013.01); *G07F 17/34* (2013.01)

(58) Field of Classification Search
CPC ............................. G07F 17/3258; G07F 17/34
See application file for complete search history.

(56) References Cited

U.S. PATENT DOCUMENTS

| | | | |
|---|---|---|---|
| 5,115,055 | A | 5/1992 | Dais et al. |
| 5,280,909 | A | 1/1994 | Tracy |

(Continued)

FOREIGN PATENT DOCUMENTS

| | | |
|---|---|---|
| WO | WO0032286 | 6/2000 |
| WO | WO2005023385 | 3/2005 |

(Continued)

OTHER PUBLICATIONS

Letter from Marvin A. Motsenbocker of Mots Law dated Jul. 8, 2011 regarding Third Party Submission in Published Application Under 37 C.F.R. 1.99 filed for U.S. Appl. No. 12/617,475 (1 page).

(Continued)

*Primary Examiner* — David L Lewis
*Assistant Examiner* — Shauna-Kay Hall
(74) *Attorney, Agent, or Firm* — Neal, Gerber & Eisenberg, LLP

(57) ABSTRACT

Gaming systems, gaming devices and methods that provide games that control volatility. In one embodiment, the gaming system disclosed herein enables a player to select values, or cells associated with values, that are displayed in a particular arrangement. The player selected values are distributed to other values or cells according to one or more predefined rules. In one embodiment, one or more of the player selectable values are progressive award values. At some point during the game, the gaming system randomly picks one of the remaining values that have not been selected and provides an award to the player based at least in part on the selected value.

8 Claims, 26 Drawing Sheets

Related U.S. Application Data continuation of application No. 15/825,845, filed on Nov. 29, 2017, now abandoned, which is a continuation of application No. 14/495,504, filed on Sep. 24, 2014, now Pat. No. 9,842,466, which is a division of application No. 12/617,475, filed on Nov. 12, 2009, now Pat. No. 8,858,318.

(56) References Cited

U.S. PATENT DOCUMENTS

| | | | |
|---|---|---|---|
| 5,344,144 | A | 9/1994 | Canon |
| 5,564,700 | A | 10/1996 | Celona |
| 5,611,730 | A | 3/1997 | Weiss |
| 5,655,961 | A | 8/1997 | Acres et al. |
| 5,766,076 | A | 6/1998 | Pease et al. |
| 5,855,515 | A | 1/1999 | Pease et al. |
| 5,885,158 | A | 3/1999 | Torango et al. |
| 6,110,043 | A | 8/2000 | Olsen |
| 6,146,273 | A | 11/2000 | Olsen |
| 6,162,121 | A | 12/2000 | Morro et al. |
| 6,190,255 | B1 | 2/2001 | Thomas et al. |
| 6,210,275 | B1 | 4/2001 | Olsen |
| 6,217,448 | B1 | 4/2001 | Olsen |
| 6,231,445 | B1 | 5/2001 | Acres |
| 6,315,664 | B1 | 11/2001 | Baerlocher et al. |
| 6,346,043 | B1 | 2/2002 | Colin et al. |
| 6,413,161 | B1 | 7/2002 | Baerlocher et al. |
| 6,435,511 | B1 | 8/2002 | Vancura et al. |
| RE37,885 | E | 10/2002 | Acres et al. |
| 6,514,141 | B1 | 2/2003 | Kaminkow et al. |
| 6,537,150 | B1 | 3/2003 | Luciano |
| 6,554,703 | B1 | 4/2003 | Bussick et al. |
| 6,575,830 | B2 | 6/2003 | Baerlocher et al. |
| 6,585,591 | B1 | 7/2003 | Baerlocher et al. |
| 6,599,193 | B2 | 7/2003 | Baerlocher et al. |
| 6,602,137 | B2 | 8/2003 | Kaminkow et al. |
| 6,632,139 | B1 | 10/2003 | Baerlocher |
| 6,634,943 | B1 | 10/2003 | Baerlocher |
| 6,669,559 | B1 | 12/2003 | Baerlocher et al. |
| 6,676,516 | B2 | 1/2004 | Baerlocher et al. |
| 6,726,565 | B2 | 4/2004 | Hughs-Baird |
| 6,733,386 | B2 | 5/2004 | Cuddy et al. |
| 6,783,457 | B2 | 8/2004 | Hughs-Baird et al. |
| RE38,812 | E | 10/2005 | Acres et al. |
| 6,958,013 | B2 | 10/2005 | Miereau et al. |
| 6,966,834 | B1 | 11/2005 | Johnson |
| 6,976,915 | B2 | 12/2005 | Baker et al. |
| 7,040,984 | B2 | 5/2006 | Mead |
| 7,056,215 | B1 | 6/2006 | Olive |
| 7,070,505 | B2 | 7/2006 | Vancura et al. |
| 7,297,059 | B2 | 11/2007 | Vancura et al. |
| 7,314,408 | B2 | 1/2008 | Cannon |
| 7,357,716 | B2 | 4/2008 | Marks et al. |
| 7,371,169 | B2 | 5/2008 | Baerlocher |
| 7,470,184 | B2 | 12/2008 | Baerlocher et al. |
| 7,575,514 | B2 | 8/2009 | Cuddy et al. |
| 7,578,740 | B2 | 8/2009 | Marks et al. |
| 7,651,392 | B2 | 1/2010 | Pennington et al. |
| 7,666,093 | B2 | 2/2010 | Lafky et al. |
| 8,043,153 | B2 | 10/2011 | Ross et al. |
| 2002/0072402 | A1 | 6/2002 | Baerlocher |
| 2002/0151354 | A1 | 10/2002 | Boesen et al. |
| 2003/0027628 | A1 | 2/2003 | Luciano |
| 2003/0153385 | A1 | 8/2003 | Ikeya et al. |
| 2003/0216166 | A1 | 11/2003 | Baerlocher et al. |
| 2003/0236116 | A1 | 12/2003 | Marks et al. |
| 2004/0048644 | A1 | 3/2004 | Gerrard et al. |
| 2004/0048662 | A1 | 3/2004 | Ulmer |
| 2004/0053672 | A1 | 3/2004 | Baerlocher |
| 2004/0204218 | A1 | 10/2004 | Hughs-Baird |
| 2004/0204235 | A1 | 10/2004 | Walker et al. |
| 2005/0003880 | A1 | 1/2005 | Englman et al. |
| 2005/0059446 | A1 | 3/2005 | Kaminkow |
| 2006/0025195 | A1 | 2/2006 | Pennington et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0084494 | A1 | 4/2006 | Belger et al. |
| 2006/0178203 | A1 | 8/2006 | Hughes et al. |
| 2006/0183535 | A1 | 8/2006 | Marks et al. |
| 2006/0183537 | A1 | 8/2006 | Dickerson |
| 2007/0054733 | A1 | 3/2007 | Baerlocher |
| 2007/0060271 | A1 | 3/2007 | Gregan et al. |
| 2007/0060314 | A1 | 3/2007 | Baerlocher et al. |
| 2007/0060321 | A1 | 3/2007 | Vasquez et al. |
| 2007/0105619 | A1 | 5/2007 | Kniesteadt et al. |
| 2007/0184887 | A1 | 8/2007 | Cannon |
| 2007/0191088 | A1 | 8/2007 | Breckner et al. |
| 2007/0202943 | A1 | 8/2007 | Thomas |
| 2007/0218975 | A1 | 9/2007 | Iddings et al. |
| 2007/0218982 | A1 | 9/2007 | Baerlocher |
| 2007/0249419 | A1 | 10/2007 | Tarantino |
| 2007/0298874 | A1 | 12/2007 | Baerlocher et al. |
| 2007/0298875 | A1 | 12/2007 | Baerlocher et al. |
| 2008/0009336 | A1 | 1/2008 | Walker |
| 2008/0039191 | A1 | 2/2008 | Cuddy |
| 2008/0090651 | A1 | 4/2008 | Baerlocher |
| 2008/0108410 | A1 | 5/2008 | Baerlocher |
| 2008/0108423 | A1 | 5/2008 | Benbrahim et al. |
| 2008/0108430 | A1 | 5/2008 | Evans |
| 2008/0108431 | A1 | 5/2008 | Cuddy et al. |
| 2008/0113765 | A1 | 5/2008 | DeWaal |
| 2008/0113779 | A1 | 5/2008 | Cregan |
| 2008/0188295 | A1 | 8/2008 | Seelig |
| 2008/0274790 | A1 | 11/2008 | Cannon |
| 2009/0042638 | A1 | 2/2009 | Thomas |
| 2009/0042645 | A1 | 2/2009 | Graham et al. |
| 2009/0088244 | A1 | 4/2009 | Nicely et al. |
| 2009/0111561 | A1 | 4/2009 | Dewaal et al. |
| 2009/0124362 | A1 | 5/2009 | Cuddy et al. |
| 2009/0124363 | A1 | 5/2009 | Baerlocher et al. |
| 2009/0124364 | A1 | 5/2009 | Cuddy et al. |
| 2009/0143127 | A1 | 6/2009 | Frick et al. |
| 2010/0004047 | A1 | 1/2010 | Acres |
| 2010/0120521 | A1 | 5/2010 | Caputo et al. |

FOREIGN PATENT DOCUMENTS

| | | |
|---|---|---|
| WO | WO2007098035 | 8/2007 |
| WO | WO2007098038 | 8/2007 |

OTHER PUBLICATIONS

Third Party Submission in Published Application Under 37 C.F.R. 1.99 filed for U.S. Appl. No. 12/617,475, dated Jul. 8, 2011 (3 pages).

English translation of paragraphs [0013] and [0014] submitted with Third Party Submission in Published Application Under 37 C.F.R. 1.99 filed for U.S. Appl. No. 12/617,475 (1 page).

FIG. 6

102

| | Example 1 | Example 2 | Example 3 |
|---|---|---|---|
| Average of Values | 331 | 331 | 331 |
| Standard Deviation | 280 | 204 | 399 |

FIG. 8A 16,18

| Progressive Award Level | Progressive Award |
|---|---|
| 1 | 100,000.04 |
| 2 | 5,000.08 |
| 3 | 500.12 |
| 4 | 100.16 |
| 5 | 40.24 |
| 6 | 20.50 |

122

60

62

| | | | |
|---|---|---|---|
| 20.50 Progressive Award #6 A | 500 B | 100 C | 250 D |
| 300 E | 100.16 Progressive Award #4 F | 1000 G | 40 H |
| 100,000.04 Progressive Award #1 I | 40.24 Progressive Award #5 J | 200 K | 300 L |
| 30 M | 400 N | 500.12 Progressive Award #3 O | 5000.08 Progressive Award #2 P |

64 NUMBER OF SELECTIONS: 4

PLEASE SELECT A FIRST AWARD VALUE. YOU WILL BE ABLE TO SEQUENTIALLY SELECT A TOTAL OF FOUR AWARD VALUES. FOR EACH SELECTION, A PORTION OF THE SELECTED AWARD VALUE WILL BE DISTRIBUTED TO EACH ADJACENT AWARD VALUE.

120

FIG. 8B 16,18

122

| Progressive Award Level | Progressive Award |
|---|---|
| 1 | 100,010.09 |
| 2 | 5,000.08 |
| 3 | 500.12 |
| 4 | 110.22 |
| 5 | 40.24 |
| 6 | 20.50 |

60

62

| | | | |
|---|---|---|---|
| 20.50 Progressive Award #6 A | 500 B | 100 C | 250 D |
| 300 E | 110.22 Progressive Award #4 F | 1000 G | 40 H |
| 100,010.09 Progressive Award #1 I | 40.24 Progressive Award #5 J | 210.06 K | 300 L |
| 30 M | 410.06 N | 500.12 Progressive Award #3 O | 5000.08 Progressive Award #2 P |

64 NUMBER OF SELECTIONS: 3

YOU SELECTED THE PROGRESSIVE AWARD VALUE 40.24. A PORTION OF THE PROGRESSIVE AWARD VALUE OF 40.24 HAS BEEN DISTRIBUTED TO EACH ADJACENT AWARD VALUE. YOU HAVE THREE SELECTIONS REMAINING.

124

FIG. 9A 16,18

| Progressive Award Level | Progressive Award |
|---|---|
| 1 | 100,000.04 |
| 2 | 5,000.08 |
| 3 | 500.12 |
| 4 | 100.16 |
| 5 | 40.24 |
| 6 | 20.50 |

123

60

62

| | | | |
|---|---|---|---|
| 20.50 Progressive Award #6 A | 40.24 Progressive Award #5 B | 100,000.04 Progressive Award #1 C | 20.50 Progressive Award #6 D |
| 500.12 Progressive Award #3 E | 100.16 Progressive Award #4 F | 40.24 Progressive Award #5 G | 100.16 Progressive Award #4 H |
| 20.50 Progressive Award #6 I | 40.24 Progressive Award #5 J | 500.12 Progressive Award #3 K | 20.50 Progressive Award #6 L |
| 5000.08 Progressive Award #2 M | 20.50 Progressive Award #6 N | 100.16 Progressive Award #4 O | 40.24 Progressive Award #5 P |

64

NUMBER OF SELECTIONS: 4

PLEASE SELECT A FIRST PROGRESSIVE AWARD VALUE. YOU WILL BE ABLE TO SEQUENTIALLY SELECT A TOTAL OF FOUR PROGRESSIVE AWARD VALUES. FOR EACH SELECTION, A PORTION OF THE SELECTED PROGRESSIVE AWARD VALUE WILL BE DISTRIBUTED TO EACH ADJACENT PROGRESSIVE AWARD VALUE.

126

FIG. 9B 16,18

123

| Progressive Award Level | Progressive Award |
|---|---|
| 1 | 100,000.04 |
| 2 | 5,000.08 |
| 3 | 510.18 |
| 4 | 110.22 |
| 5 | 40.00 |
| 6 | 40.62 |

60

62

| | | | |
|---|---|---|---|
| 40.62 Progressive Award #6 A | 40.00 Progressive Award #5 B | 100,000.04 Progressive Award #1 C | 40.62 Progressive Award #6 D |
| 510.18 Progressive Award #3 E | 110.22 Progressive Award #4 F | 40.00 Progressive Award #5 G | 110.22 Progressive Award #4 H |
| 40.62 Progressive Award #6 I | 40.24 Progressive Award #5 J | 510.18 Progressive Award #3 K | 40.62 Progressive Award #6 L |
| 5000.08 Progressive Award #2 M | 40.62 Progressive Award #6 N | 110.22 Progressive Award #4 O | 40.00 Progressive Award #5 P |

64

NUMBER OF SELECTIONS: 3

128

YOU SELECTED THE PROGRESSIVE AWARD VALUE 40.24. A PORTION OF THE PROGRESSIVE AWARD VALUE OF 40.24 HAS BEEN DISTRIBUTED TO EACH ADJACENT PROGRESSIVE AWARD VALUE.

160

| Progressive Award Level | Progressive Award |
|---|---|
| 1 | 100,000.00 |
| 2 | 5,000.00 |
| 3 | 500.00 |
| 4 | 100.00 |
| 5 | 40.00 |
| 6 | **20.00** |

162

| Progressive Award Level | Progressive Award |
|---|---|
| 1 | 100,004.00 |
| 2 | 5,004.00 |
| 3 | 504.00 |
| 4 | 104.00 |
| 5 | **44.00** |
| 6 | 20.00 |

164

| Progressive Award Level | Progressive Award |
|---|---|
| 1 | 100,015.00 |
| 2 | 5,015.00 |
| 3 | 515.00 |
| 4 | **115.00** |
| 5 | 40.00 |
| 6 | 20.00 |

166

| Progressive Award Level | Progressive Award |
|---|---|
| 1 | 100,053.33 |
| 2 | 5,053.33 |
| 3 | **553.34** |
| 4 | 100.00 |
| 5 | 40.00 |
| 6 | 20.00 |

168

| Progressive Award Level | Progressive Award |
|---|---|
| 1 | 100,330.00 |
| 2 | **5,330.00** |
| 3 | 500.00 |
| 4 | 100.00 |
| 5 | 40.00 |
| 6 | 20.00 |

170

| Progressive Award Level | Progressive Award |
|---|---|
| 1 | 105,660.00 |
| 2 | 5,000.00 |
| 3 | 500.00 |
| 4 | 100.00 |
| 5 | 40.00 |
| 6 | 20.00 |

FIG. 12

172

| Progressive Award Level | Odds | Contribution (%) | Average Award as Regular Progressive | Average Award According to the Progressive Award Distribution Feature | Upon a Progressive Award Bonus Triggering Event, the Probability of Distributing Progressive Award and Advancing A Level (%) | Effective Odds | Effective Contribution (%) |
|---|---|---|---|---|---|---|---|
| 1 | 32,000,000 | 0.125 | $100,000.00 | $412,506.83 | 0.00 | 32,000,000 | 0.516 |
| 2 | 800,000 | 0.250 | $5,000.00 | $12,500.17 | 2.50 | 820,513 | 0.609 |
| 3 | 40,000 | 0.500 | $500.00 | $853.67 | 5.00 | 42,105 | 0.811 |
| 4 | 4,000 | 1.00 | $100.00 | $131.00 | 10 | 4,444 | 1.79 |
| 5 | 800 | 2.00 | $40.00 | $44.00 | 20.00 | 1,000 | 1.76 |
| 6 | 200 | 4.00 | $20.00 | $20.00 | 25.00 | 267 | 3.00 |
| | Total | 7.875 | | | | Total | 7.875 |

GAMING SYSTEMS, GAMING DEVICES AND METHODS WITH VOLATILITY CONTROL GAMES

PRIORITY CLAIM

This application is a continuation of, claims priority to and the benefit of U.S. patent application Ser. No. 17/032,917, filed on Sep. 25, 2020, which is a continuation of, claims priority to and the benefit of U.S. patent application Ser. No. 15/825,845, filed on Nov. 29, 2017, which is a continuation of, claims priority to and the benefit of U.S. patent application Ser. No. 14/495,504 filed on Sep. 24, 2014, which is a divisional of, claims priority to and the benefit of U.S. patent application Ser. No. 12/617,475 filed on Nov. 12, 2009, the entire contents of each are incorporated by reference herein.

BACKGROUND

Gaming devices which provide players awards in primary or base games are well known. Gaming devices generally require the player to place or make a wager to activate the primary or base game. In many of these gaming devices, the award is based on the player obtaining a winning symbol or symbol combination and on the amount of the wager (e.g., the higher the wager, the higher the award). Symbols or symbol combinations which are less likely to occur usually provide higher awards.

In such known gaming devices, the amount of the wager made on the primary game by the player may vary. For instance, the gaming device may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming device, such as a slot game, may enable players to make wagers of substantially different amounts on each play of the primary or base game ranging, for example, from 1 credit up to 125 credits (e.g., 5 credits on each of 25 separate paylines). Accordingly, it should be appreciated that different players play at substantially different wagering amounts or levels and at substantially different rates of play.

Secondary or bonus games are also known in gaming devices. The secondary or bonus games usually provide an additional award to the player. Secondary or bonus games usually do not require an additional wager by the player to be activated. Certain secondary or bonus games are activated or hit upon an occurrence of a designated triggering symbol or triggering symbol combination in the primary or base game. For instance, a bonus symbol occurring on the payline on the third reel of a three reel slot machine may hit the secondary bonus game. Part of the enjoyment and excitement of playing certain gaming devices is the occurrence or triggering of the secondary or bonus game (even before the player knows how much the bonus award will be).

One known type of secondary game is a player selection game. For certain known player selection games, the gaming device displays a plurality of positions to a player, some of which are associated with awards and at least one of which is associated with a terminating symbol. In these types of games, typically the gaming device enables a player to select positions until the player selects a position with a terminating symbol, at which time the gaming device provides the player with any earned awards and the game ends. In other similar known selection games, the gaming device enables a player to select a limited number of positions.

Other known selection games are matching games. These games typically require a player to pick selections until the player picks two or more matching symbols. While player selection games are very popular, they are inherently random and do not offer meaningful choices to players.

Another known type of selection game offers a player a choice between different starting amounts of free spins and multipliers. For example, one such game enables a player to select between, "15 free spins at 2×," "10 free spins at 3×," an "5 free spins at 6×."

Progressive awards associated with gaming machines are also known. In one form, a progressive award is an award amount which includes an initial amount funded by a casino and an additional amount funded through a portion of each wager made on the progressive gaming machine. For example, 0.1% of each wager placed on the primary game of the gaming machine associated with the progressive award may be allocated to the progressive award or progressive award fund or pool. The progressive award grows in value as more players play the gaming machines and more portions of these players' wagers are allocated to the progressive award. When a triggering event occurs, such as a player obtains a winning symbol or symbol combination associated with the progressive award or the accumulated progressive award increments to a progressive award hit value, the accumulated progressive award is provided to the player. After the progressive award is provided to the player, the amount of the next progressive award is reset to the initial value and a portion of each subsequent wager on a gaming machine associated with a progressive award is allocated to the next progressive award.

Moreover it is known that a gaming machine or bank of gaming machines may be simultaneously associated with a plurality of progressive awards. In these multi-level progressive ("MLP") configurations, a plurality of progressive awards are arranged in a hierarchy and can start at different award or value levels, such as $10, $100, $1000 and $10,000. Each progressive award individually increments or increases until a suitable triggering event at one of more of the gaming devices associated with the MLP causes one or more of the progressive awards to be provided to one or more of the players. In these known gaming systems, once a player is selected to be provided one or more of the progressive awards of the MLP, the gaming system either selects one of the progressive awards to be awarded to the player or enables the player to participate in an event to determine which progressive award they will be provided.

One known problem with a typical multi-level progressive configuration is there are a limited number of ways to increase the rate at which the progressive awards are incremented. For example, one way to increase the increment rate is to require the player to place a higher wager for a play of the primary game. Requiring a higher wager, however, can deter players from playing such games and cause players to seek other less expensive games. Another way to increase the rate at which the progressive awards are incremented is to increase the contribution amount or portion of each wager that funds the progressive awards. Assuming the same average expected payback, this typically decreases the value of the non-progressive awards. Another way to increase the rate at which the progressive awards are incremented is to increase the number of gaming machines associated with the progressive awards. This alternative is typically effective only if the game offering the progressive awards is popular and in high demand. Another way to increase the rate at which the progressive awards are incremented is to require players to place a minimum bet in the primary game to be eligible for one of the progressive awards. This, however, is typically only effective if some players are willing to play the primary game, but not be eligible for one of the progressive awards. A final way to increase the rate at which the progressive awards are incremented is to increase the portion of the contribution amount funded by the casino. However, this alternative is typically limited in its occurrence and associated with a special promotional event.

SUMMARY

Various embodiments of the present disclosure generally relate to gaming systems, gaming devices and methods that provide selection games that control volatility by selecting or causing selection of values or cells having associated values, wherein the selected values are distributed to other values or cells according to predefined rules. At a designated point, the gaming system provides an award based on one or more of the remaining values which have not been selected. Thus, the selection of certain values affects the values of one or more other cells and therefore the ultimate award provided to the player.

In one embodiment, the gaming system displays a play of a game that includes an arrangement of values. The gaming system enables a player to make a designated number of selections of the displayed values in the displayed arrangement. After a player selects a value, that value is no longer available for future selection by the player in the play of the game. Sequentially, for each selected value, according to one or more predefined rules, a portion of the selected value is distributed to each of a designated number of the other values which have not been previously selected by the player. Each of the other receiving values is modified by the respective designated portion. After the player makes the designated number of selections, the gaming system randomly picks at least one of the remaining values which have not been previously selected by the player. The gaming system then determines an award for the player based on the randomly picked value and provides the award to the player.

In one such embodiment, the displayed values are arranged in a matrix having a number of rows and columns which define individual cells. Each displayed respective value is associated with a different one of the cells of the matrix. The gaming system enables a player to sequentially select cell values.

In one embodiment, the gaming system determines an award for the player by randomly selecting a single one of the remaining values which has not been selected by the player. In one such embodiment, the determined award is a number of credits equal to the randomly selected value. In another embodiment, the gaming system determines an award by randomly selecting a plurality of the remaining values which have not been selected by the player. In one such embodiment, the determined award is a number of credits equal to the sum of the plurality of randomly picked values, or is a number of credits equal to any other suitable mathematical operation applied to the plurality of randomly picked values.

In one embodiment, according to the predefined rules, the gaming system causes the player selected value to be divided by the number of cell values adjacent to the selected cell value which have not been selected, and adds the respective divided cell value to each of the adjacent cell values. In one such embodiment, an adjacent cell value is one cell to the right and left of the player selected cell and one cell above and below the player selected cell.

In one embodiment, instead of the player selecting all of the displayed values in the arrangement, both the gaming system and the player each select a designated number of the displayed values in the arrangement. In another embodiment, the gaming system selects each of the designated number of selections of the displayed values.

In one embodiment, the values associated with the cells are determined before the cells are selected, such as a displayed credit value. In another embodiment, the values associated with the cells are determined after the cells are selected, such as a quantity of free spins. In other words, the value of each free spin is determined after the free spin occurs and after a random generation occurs. In one embodiment, the values associated with the cells are static values, such as award amounts or multiplier amounts. In another embodiment, the values associated with the cells are dynamic or variable awards, such as progressive awards. In one such embodiment, the gaming system maintains a plurality of progressive awards in a multi-level progressive award configuration. In one such embodiment, a plurality of the values associated with the individual cells are progressive awards or progressive award values. In this embodiment, if a cell associated with a progressive award or progressive award value is selected, the gaming system distributes at least a portion of that progressive award or progressive award value to each adjacent cell according to a predefined rule. In one such embodiment, if a cell associated with a progressive award or progressive award value is selected and the gaming system determines that a portion of this progressive award is to be distributed to other cells also having progressive awards or progressive award values, then a portion of one progressive award is distributed or transferred to at least another progressive award according to the predefined rule.

In another embodiment utilizing a plurality of progressive awards, if a progressive award bonus event is triggered, the gaming system enables a player to play for a first one of the progressive awards. In this embodiment, if the gaming system determines to provide the first progressive award to the player (i.e., the gaming system determines that the player does not advance to play for a subsequent progressive award of a second subsequent progressive award level), the gaming system provides the progressive award to the player and the bonus event ends. On the other hand, if the gaming system determines to advance the player to play for a second subsequent progressive award of a second subsequent progressive award level (i.e., the gaming system determines not to provide the first progressive award to the player), the gaming system distributes at least a portion of the value of the first progressive award to one or more of the remaining progressive awards. The gaming system then enables the player to play for the second progressive award (which has been modified, at least in part, by a portion of the first progressive award). This process continues until the gaming system determines to provide a progressive award. Such a gaming system thus provides a game in which part or all of a progressive award value is redistributed to one or more other maintained progressive award values.

Additional features and advantages are described in, and will be apparent from, the following Detailed Description and the figures.

BRIEF DESCRIPTION OF THE FIGURES

FIG. 6 is a table illustrating the average award value and standard deviation for each of the examples of FIGS. 3A, 3B, 3C, 3D, 3E and 3F; FIGS. 4A, 4B, 4C, 4D, 4E and 4F; and FIGS. 5A, 5B, 5C, 5D, 5E and 5F FIGS. 7A, 7B, 7C, 7D and 7E are front views of a gaming device display enabling a play of a game in accordance with another embodiment of the gaming system disclosed herein.

FIGS. 8A and 8B and are front views of a gaming device display enabling a play of a game in accordance with another embodiment of the gaming system disclosed herein.

FIGS. 9A and 9B and are front views of a gaming device display enabling a play of a game in accordance with another embodiment of the gaming system disclosed herein.

FIG. 12 is a table illustrating one example embodiment of a multi-level progressive of the present disclosure relative to a typical multi-level progressive.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
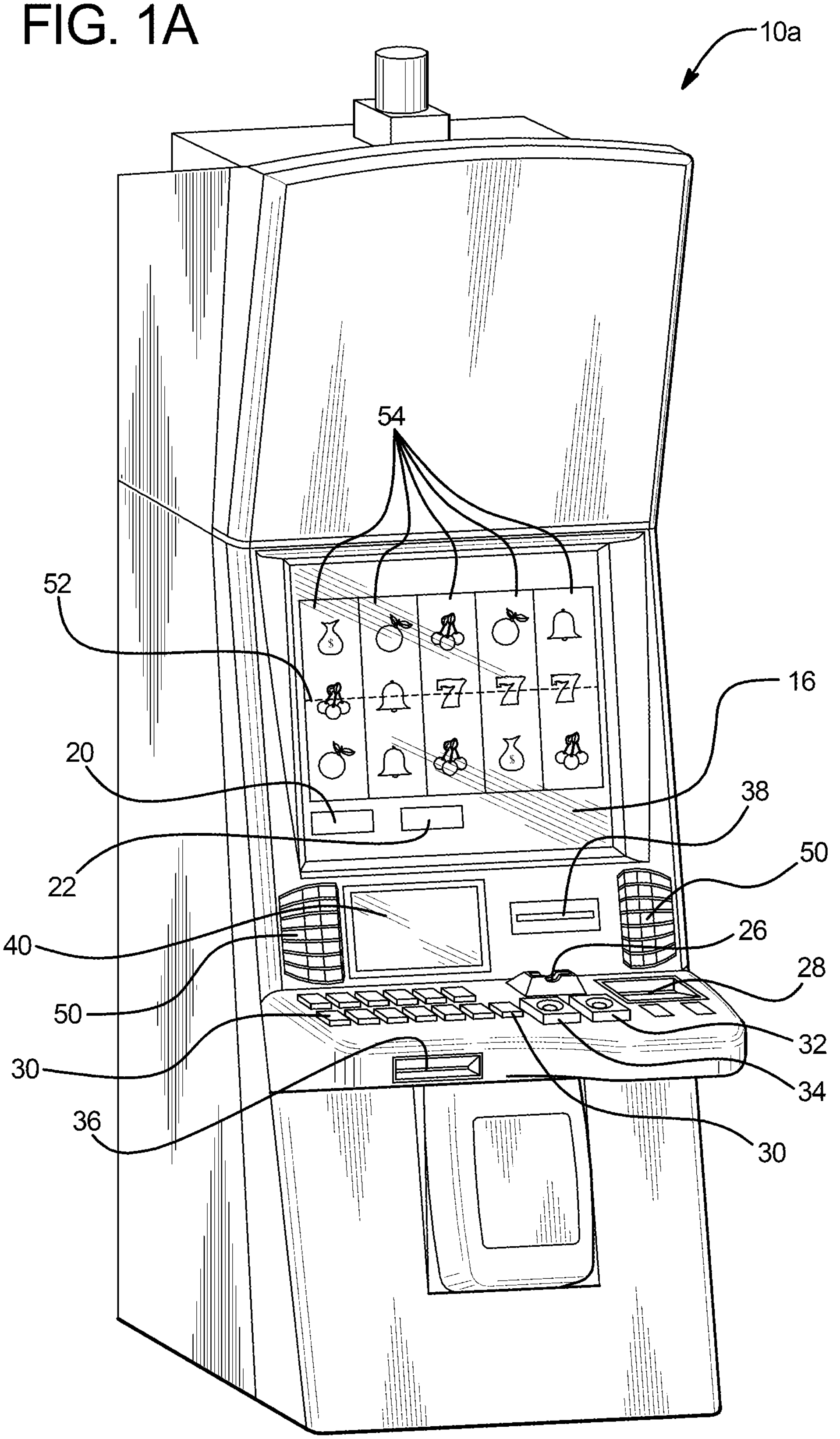
FIGS. 1A and 1B are perspective views of example alternative embodiments of the gaming device of the present disclosure.
Figure 1B:
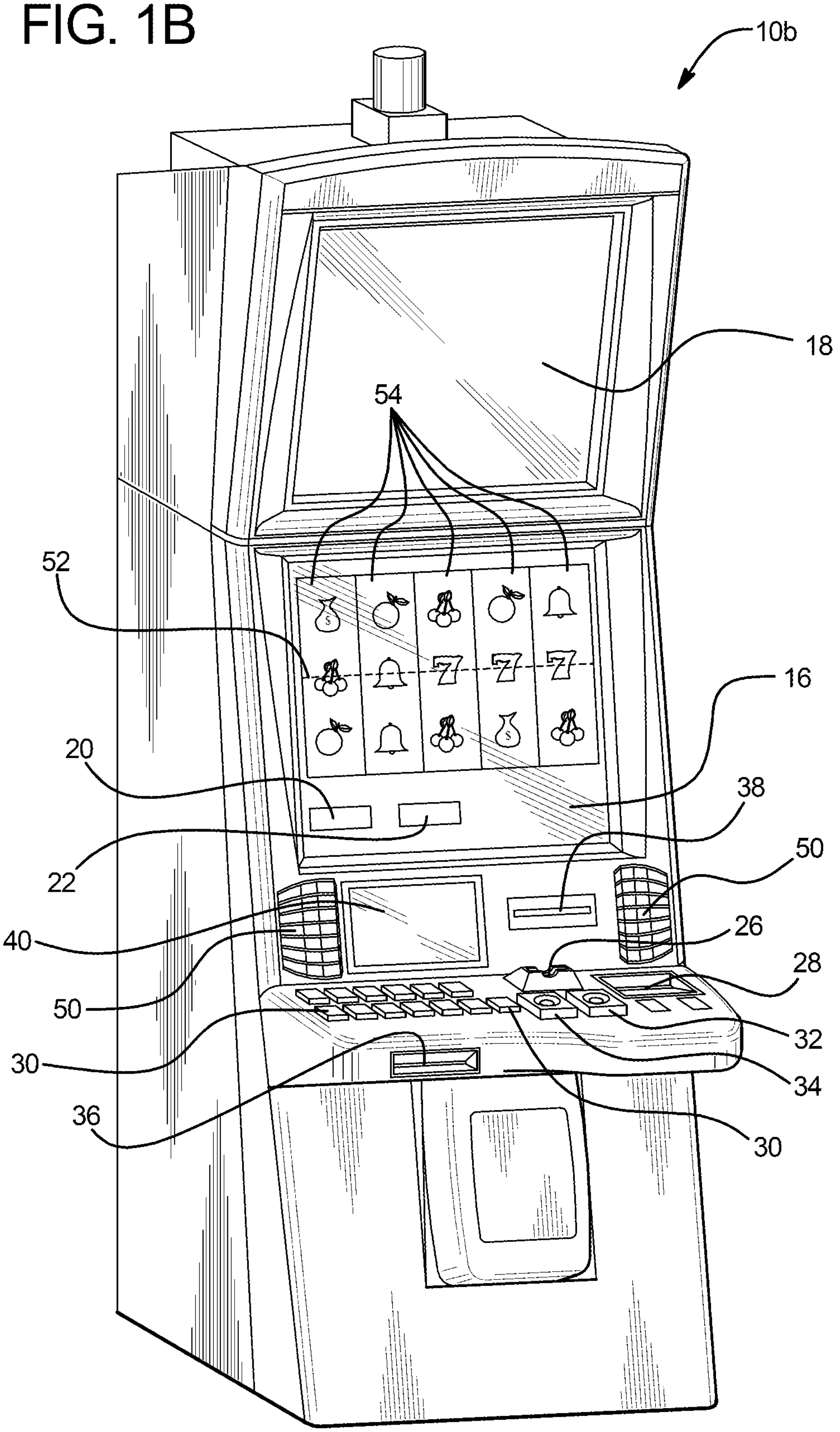

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
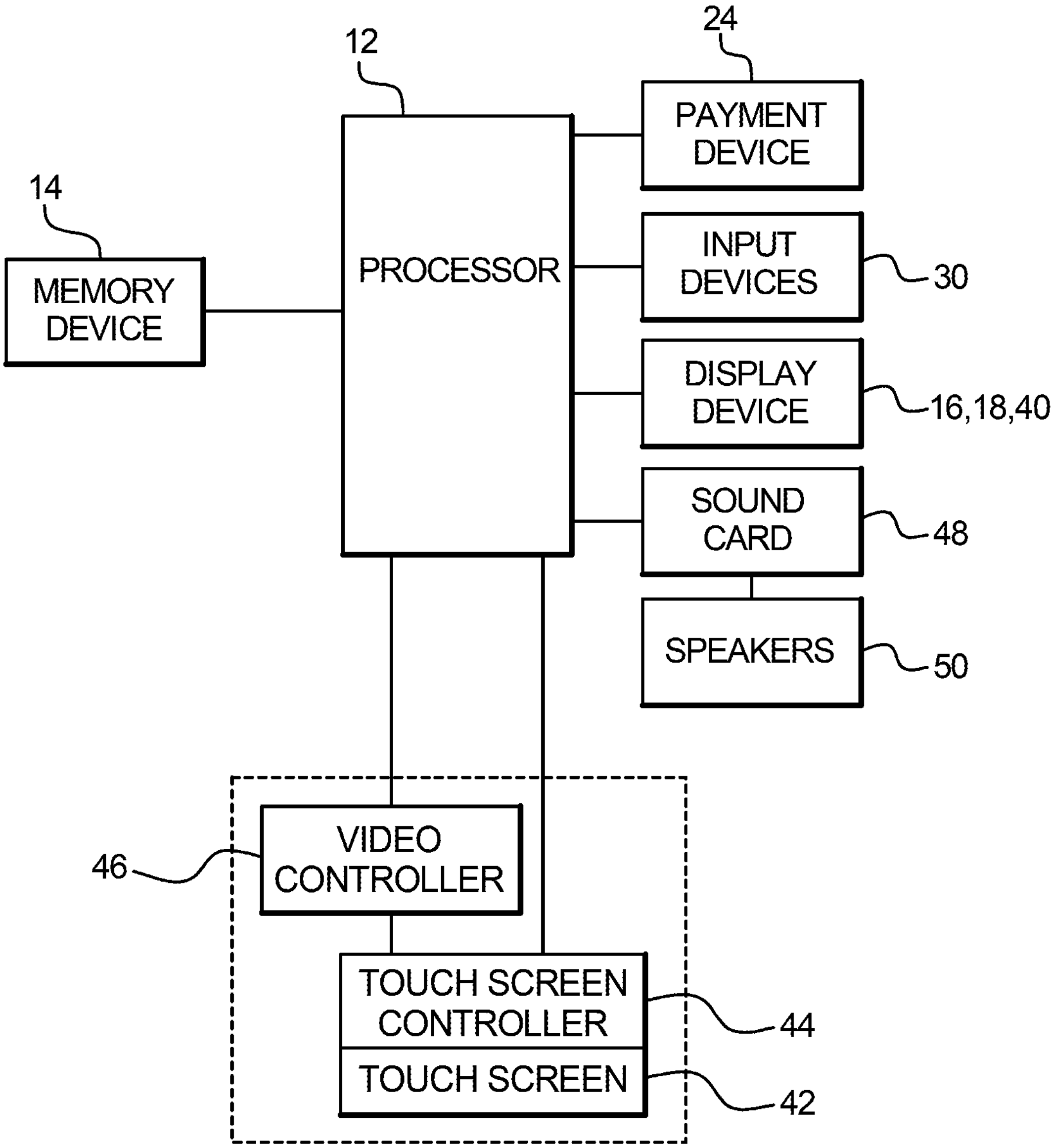
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, roulette-type game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo, video scratch card, video roulette, or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, a base or primary game may be a video scratch card game in which the gaming device displays a plurality of selectable indicia on at least one of the display devices. In this embodiment, the gaming device enables the player to select at least one of the selectable indicia via an input device such as a touch screen. In one such embodiment, for each player selection of one of the indicia, the gaming device reveals an award. In another embodiment, for each player selection of one of the indicia, the gaming device reveals a number or a symbol. If that revealed number or symbol matches a pre-determined number or symbol, the gaming device provides an associated award to the player. In various embodiments, the associated award is pre-determined or determined and/or revealed based on another indicia. In another such embodiment, the gaming device enables the player to select at least one indicia of one or more primary set of indicia and select at least one indicia of one or more secondary set of indicia. For each player selection of an indicia of the primary set of indicia and each player selection of an indicia of the secondary set of indicia, the gaming device reveals a number or a symbol. If the gaming device reveals a number or symbol of the primary set of indicia that matches a number or symbol of the secondary set of indicia, the gaming device provides a player with an award. In various embodiments, the associated award is pre-determined or determined and/or revealed based on another indicia.

In another embodiment of a video scratch card game, for each player selection of one of the indicia, the gaming device reveals award values, symbols, or numbers. If the gaming device reveals two or more matching award values, numbers or symbols, the gaming device provides an award to the player. In one embodiment, the gaming device provides an award equal to the matching values. In another embodiment, the gaming device provides an award that is pre-determined or determined and/or revealed based on another indicia. In another embodiment of a video scratch card game, if the player selects one of the indicia, the gaming device reveals numbers of moves on a trail or board. The locations on these trails or boards are associated with winning or losing indicia. Landing on a winning indicia provides the player with the displayed award. It should be appreciated that in various embodiments of a video scratch card game, the gaming device provides an award that is a bonus game, a progressive award, or an opportunity to play for one or more progressive awards as described herein.

In another embodiment, a base or primary game is a video roulette game including a modified standard American single zero or double zero roulette wheel. In one embodiment, at least one of the standard wells in which a ball may land (such as zero, double zero, or any other number) is replaced with one or more bonus wells. In these embodiments, if the ball lands in one of the bonus wells, the gaming device provides a bonus event or an opportunity to win one or more progressive awards. In one embodiment, the gaming device requires an additional wager to be placed to provide the bonus event or an opportunity to win one or more of the progressive awards as described herein. In various embodiments, the gaming device includes one or more bonus wells which have a size that is different from the size of the standard wells. In various embodiments, the probability of the ball landing in these bonus wells is different from the probability of the ball landing in the standard wells.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
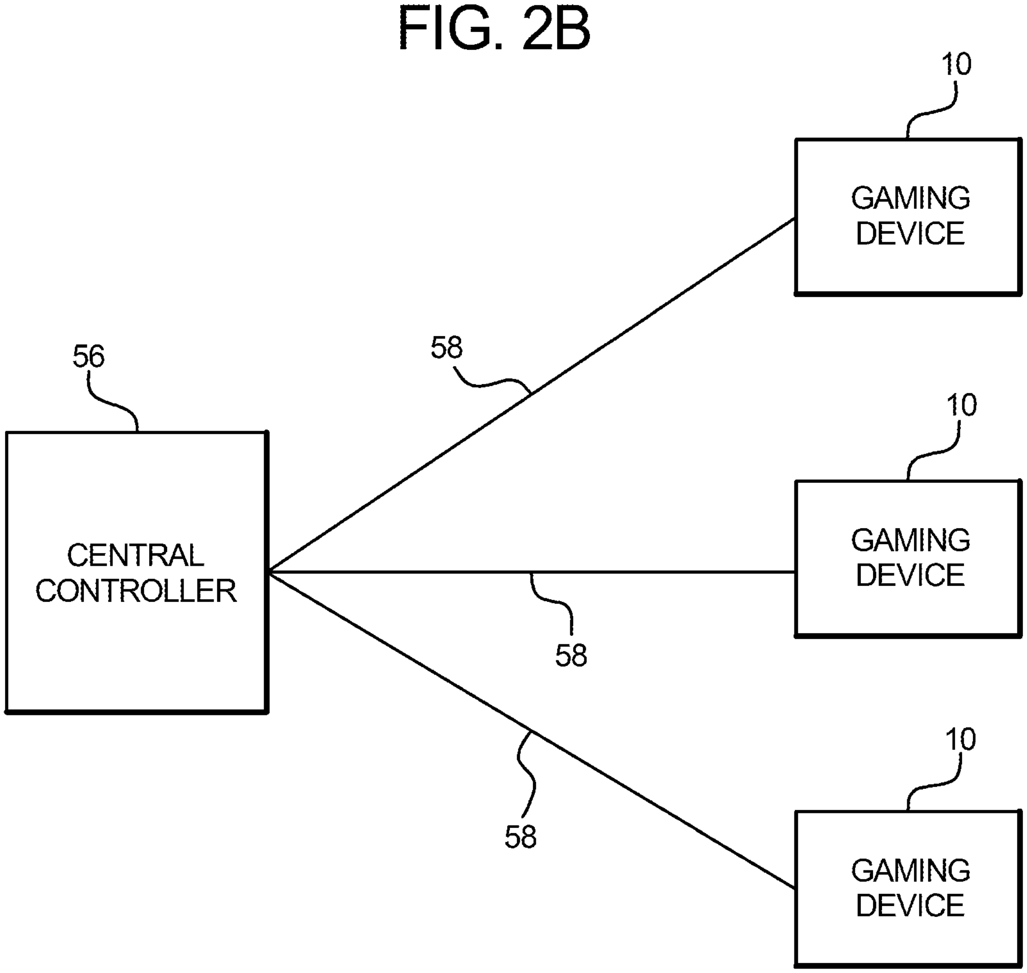
FIG. 2B is a schematic block diagram of one embodiment of a gaming system network configuration including a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner. In one such embodiment, one or more of the progressive awards are funded, at least partially, via an amount provided by one or more marketing and/or advertising departments, such as a casino's marketing department.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In one embodiment, the gaming system disclosed herein includes a plurality of progressive awards or progressive incremented values in a multi-level progressive or MLP configuration. In this embodiment, a plurality of gaming devices at one or more gaming sites are networked to the central server in an MLP configuration, wherein a portion of each wager placed is allocated to one or more progressive awards or progressive incremented values. It should be appreciated that any suitable number of progressive awards and any suitable number of progressive award levels may be implemented with the gaming system disclosed herein.

In one embodiment, different progressive awards are associated with different numbers of gaming devices. For example, a first progressive award of the MLP which is valued at $10,000 may be associated with ten gaming devices while a second progressive award of the MLP which is valued at $500,000 may be associated with one-hundred gaming devices. In one embodiment, the multiple gaming machines may be in the same bank of machines, in the same casino or gaming establishment (such as through LAN), or in two or more different casinos or gaming establishments (such as through a WAN).

In another embodiment, each individual gaming machine maintains a plurality of progressive awards in an MLP configuration wherein a portion of the wagers placed at that respective gaming machine is allocated to one or more of the progressive awards maintained by such individual gaming machine. In one embodiment, a portion of each wager placed at a designated gaming device is allocated to one or more progressive awards of the MLP associated with that designated gaming device. In another embodiment, a portion of designated wagers placed at a designated gaming device, such as a portion of each maximum wager placed or a portion of each side wager placed, is allocated to one or more progressive awards of the MLP associated with that designated gaming device. It should be appreciated that in these embodiments, the functions of the gaming system providing a progressive award in a triggered bonus event as disclosed herein are provided on the single or stand-alone gaming device.

In another embodiment, each individual gaming machine maintains one or more progressive awards of the MLP configuration and the central server simultaneously or substantially simultaneously maintains one or more progressive awards of the MLP configuration. In one such embodiment, the lower valued, more frequently triggered progressive awards of the MLP are maintained by the individual gaming machines and the higher valued, less frequently triggered progressive awards of the MLP are maintained by the central server.

In one embodiment, one or more of the progressive awards start at the same value and increment or increase until provided to a player. In another embodiment, one or more of the progressive awards start at different values and increment or increase until provided to a player. For example, the progressive award associated with the highest progressive award level of the MLP starts at the highest value and the progressive award associated with the lowest progressive award level of the MLP starts at the lowest value.

In these embodiments, the progressive awards accumulate based on a small percentage (such as 0.1%) of coin-in or wagered amounts in a conventional manner. In one such embodiment, different progressive awards associated with different levels of the MLP increment at different rates. For example, the progressive award associated with the highest progressive award level of the MLP increments at the highest rate and the progressive award associated with the lowest progressive award level of the MLP increments at the lowest rate. Such different starting values coupled with different increment rates provides that even if a progressive award triggering event occurs infrequently, the gaming system disclosed herein maintains the hierarchy of the plurality of progressive awards of the MLP.

In one embodiment, different percentages of coin-in or wagered amounts fund different progressive awards of the MLP. For example, 0.1% of coin-in funds the first level progressive award of the MLP, 0.15% of coin-in funds the second level progressive award of the MLP, and 0.2% of coin-in funds the third level progressive award of the MLP. In another embodiment, the percentage that goes to each progressive award is equal (such as 0.1% to each of the three progressive award levels of the MLP).

In one embodiment, the percentage of each wagered amount that funds one or more progressive awards is equal for each wagered amount. In another embodiment, the percentages of wagered amounts that fund one or more progressive awards are different for different wager amounts. For example, a wager of one to twenty-five credits may increment a progressive award 0.1% of the wager, a wager of twenty-six to fifty credits may increment a progressive award 0.08% of the wager and a wager of fifty-one to seventy-five credits may increment a progressive award 0.07% of the wager. In another embodiment at least a fraction of one or more of the progressive awards of the MLP are funded by the gaming establishment, such as a casino, by using a starting value higher than zero to make the progressive awards attractive even after they are reset.

In one embodiment, the central server and/or individual gaming device processor increases the progressive awards associated with the progressive award levels of the MLP until a progressive award is provided to a player (upon the occurrence of a suitable triggering event). In one embodiment, two or more of the progressive awards of the MLP are funded at different temporal rates. In this embodiment, the different progressive awards are incremented or funded in different increments of time wherein until the progressive award hits, a set amount is added to the progressive award at each determined time increment. In another embodiment, two or more of the progressive awards may each be incremented or funded based on different incrementing factors or incrementors. In this embodiment, a first of the progressive awards may increment each time a first incrementing factor occurs and a second of the progressive awards may increment each time a second incrementing factor occurs, wherein the first incrementing factor and the second incrementing factor are different. Examples of incrementing factors could be a symbol-driven trigger in the base game, the occurrence of one or more events in a bonus game, the player betting a maximum amount, a percentage of possible gaming machines being actively played or in active status, or any other suitable method for defining an incrementor.

In one embodiment, different gaming devices in the gaming system have different progressive awards of the MLP available to the player. In one such embodiment, different types of gaming devices are associated with different types of progressive awards of the MLP based on the current configuration of the gaming system. In one embodiment, zero, one or more progressive awards of the MLP may be associated with each of the gaming devices in the gaming system while zero, one or more different progressive awards of the MLP may be associated with a plurality of, but not all of the gaming devices in the gaming system.

Games with Volatility Control

Various embodiments of the gaming systems, gaming devices and methods of the present disclosure provide games that enable a player to make a defined number of selections of values displayed in a particular arrangement, or a defined number of selections of cells displayed in a particular arrangement, wherein each cell is associated with a value. For each player selection, the gaming system distributes a portion of the values to other values or cells according to one or more predefined rules. After the defined number of player selections of values or cells, the gaming system randomly selects one of the remaining displayed values that have not been selected and provides an award to the player based on the randomly selected value. Thus, the player's selection of certain values affects the values of one or more other cells and therefore the award provided to the player.

In one embodiment, the displayed values include a number of different values, including high values and low values. By displaying a number of different high and low values, the gaming system enables the player to decide whether they want to distribute high or low values to the other displayed values. Thus, the gaming system enables a player to employ various strategies in their value selection process to control the volatility of the game.

FIGS. 3A to 3F, 4A to 4F, and 5A to 5F illustrate different example embodiments of the gaming system of the present disclosure. In each example, the gaming system displays the same arrangement of initial values and provides the player with the same defined number of value selections. For each player selection of a value, the gaming system distributes a portion of that value to adjacent values in the displayed arrangement which have not been selected by the player according to a predefined rule. The predefined rule is the same in each of the examples, as discussed in more detail below. In each of the example games discussed below, the player employs a different selection strategy to control the volatility of the game.

Example 1

In the example game illustrated in FIGS. 3A to 3F, the gaming system enables the player to sequentially make four selections of the displayed values. The player in this example employs a strategy of selecting each of the smallest values from the displayed arrangement of values in an attempt to limit the chance of obtaining a small award payout after the player makes the predetermined number of selections.

Figure 3A:
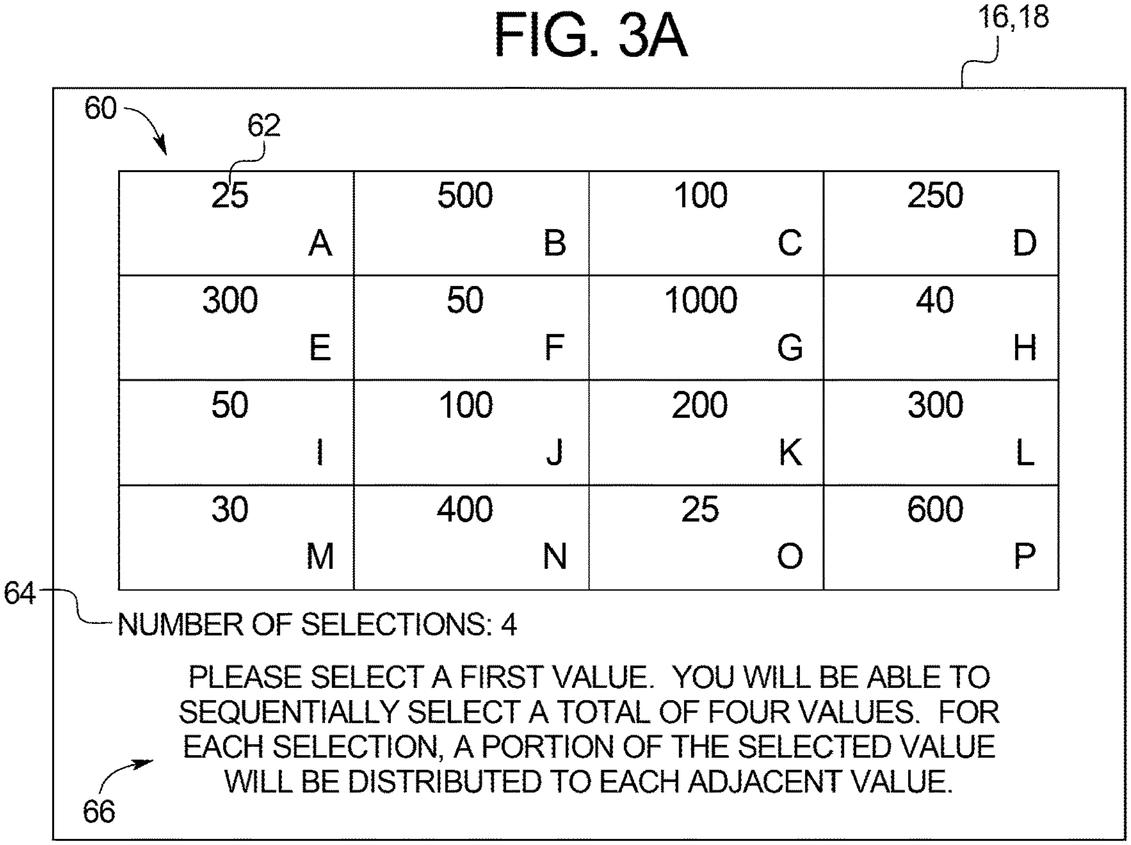
FIGS. 3A, 3B, 3C, 3D, 3E and 3F are front views of a gaming device display enabling a play of a game in accordance with an example of an embodiment of the gaming system disclosed herein.

FIG. 3A illustrates the gaming system displaying on display device 16, 18 an arrangement 60 of player selectable values 62. The displayed arrangement 60 is a matrix having four rows and four columns. The intersection of each row and each column defines individual cells A to P. Each displayed value is associated with one of the individual cells A to P. The gaming system also displays the number of selections of values the player is able to make in the game, as seen by the selections remaining display 64 in the lower left hand corner of the display device 16, 18. The gaming system also displays a suitable visual prompt, or message, to begin the game, such as message 66 of, "PLEASE SELECT A FIRST VALUE. YOU WILL BE ABLE TO SEQUENTIALLY SELECT A TOTAL OF FOUR VALUES. FOR EACH SELECTION, A PORTION OF THE SELECTED VALUE WILL BE DISTRIBUTED TO EACH ADJACENT VALUE." It should be appreciated that in each of the examples disclosed herein any suitable message could be used, such as a visual, audio or an audio/visual message.

Figure 3B:
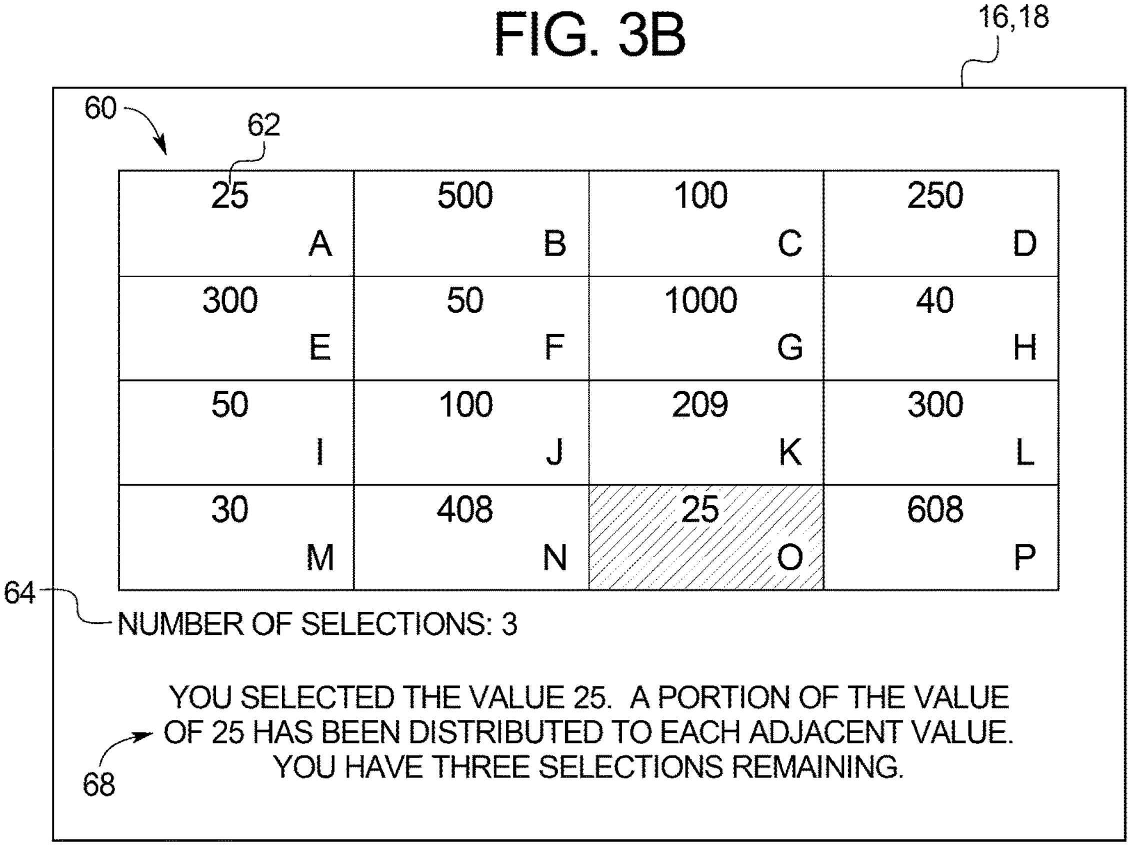

FIG. 3B illustrates the gaming system displaying the result of the player selecting the value 25 in cell 0. The selection of the value 25 causes the gaming system to mask cell 0, to indicate the value 25 has been selected and to change the number of selections displayed in the selections remaining display 64 to three, indicating the player has only three selections left in the game. The gaming system also displays the result of the distribution of a portion of the selected value 25 to each of cell values adjacent to the selected cell value according to a predefined rule, which requires the gaming system to divide the selected cell value by the number of adjacent cell values and add that result to each of the adjacent cell values. The adjacent cells are each cell to the left and right of the selected value and each cell above and below the selected cell value. In this case, there is no cell below the selected cell value so there are only three adjacent cells, i.e., cells N, P, and K. Accordingly, the gaming system divides the selected cell value of 25 by the number three, and adds that result to each of the adjacent cell values of N, P, and K. The value of 25 divided by three does not result in a whole number, thus the gaming system adds eight to the two cell values adjacent the selected cell value and adds nine to the cell value above the selected cell value. As seen, the distribution according to the predefined rule results in the display of new values of 408, 209, and 608 in cells N, K, and P respectively. The gaming system displays a suitable message such as message 68, "YOU SELECTED THE VALUE 25. A PORTION OF THE VALUE OF 25 HAS BEEN DISTRIBUTED TO EACH ADJACENT VALUE. YOU HAVE THREE SELECTIONS REMAINING."

Figure 3C:
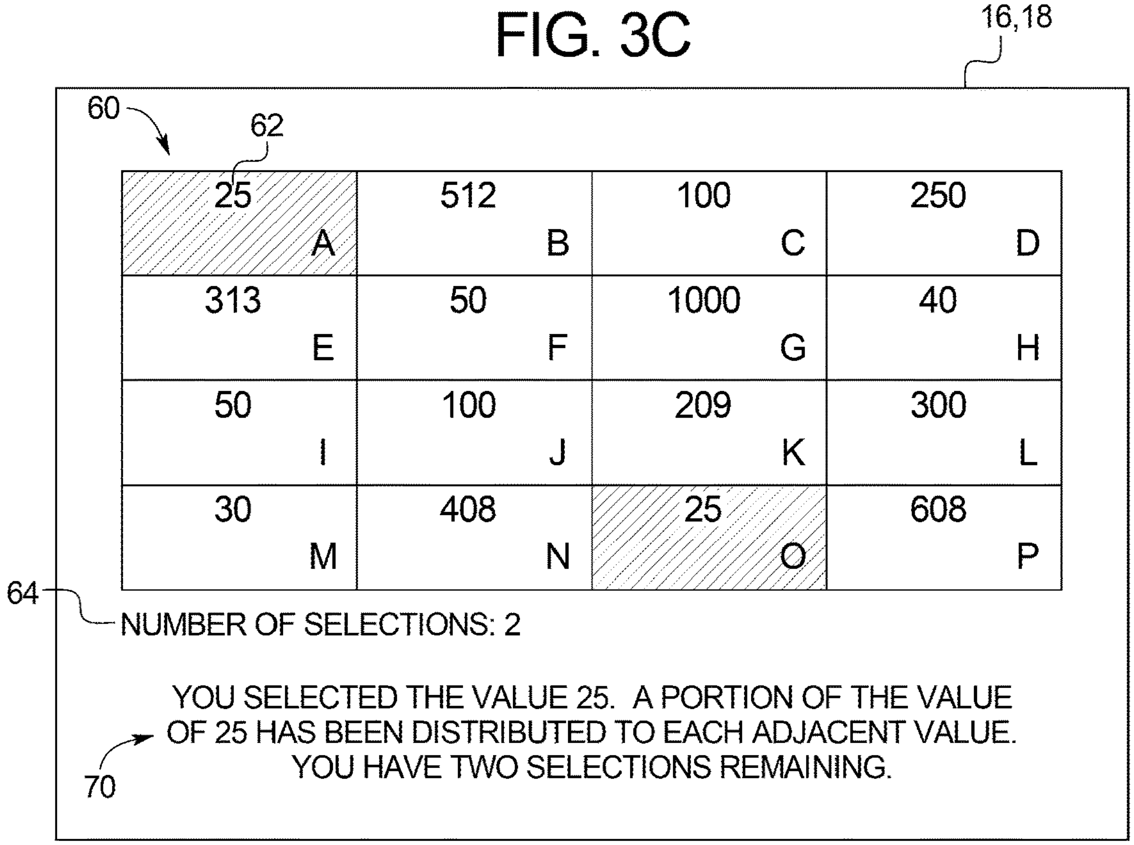

FIG. 3C illustrates the gaming system displaying the result of the player selecting the value 25 in cell A. The player selection of the value 25 causes the gaming system to mask cell A to indicate the value 25 has been selected and to change the number of selections displayed in the selection remaining display 64 to two. The gaming system displays the result of the distribution of a portion of the selected value 25 to each of the cell values adjacent the selected cell value according to the predefined rule, which requires the gaming system to divide the selected cell value by the number of adjacent cell values which have not been selected and add that result to each adjacent cell value that has not been selected. In this case, there is no cell above or to the left of the selected cell value thus there are only two adjacent cell values. Accordingly, the gaming system divides the selected cell value of 25 by the number two and adds the result to each of the adjacent cell values. Dividing the value of 25 by two does not result in a whole number, thus the gaming system adds 12 to the value in cell B and adds 13 to the value in cell E. As seen, the distribution according to the predefined rule results in the display of new values of 512 and 313 in cells B and E. The gaming system displays a suitable message such as message 70, "YOU SELECTED THE VALUE 25. A PORTION OF THE VALUE OF 25 HAS BEEN DISTRIBUTED TO EACH ADJACENT CELL WHICH HAS NOT BEEN SELECTED. YOU HAVE TWO SELECTIONS REMAINING."

Figure 3D:
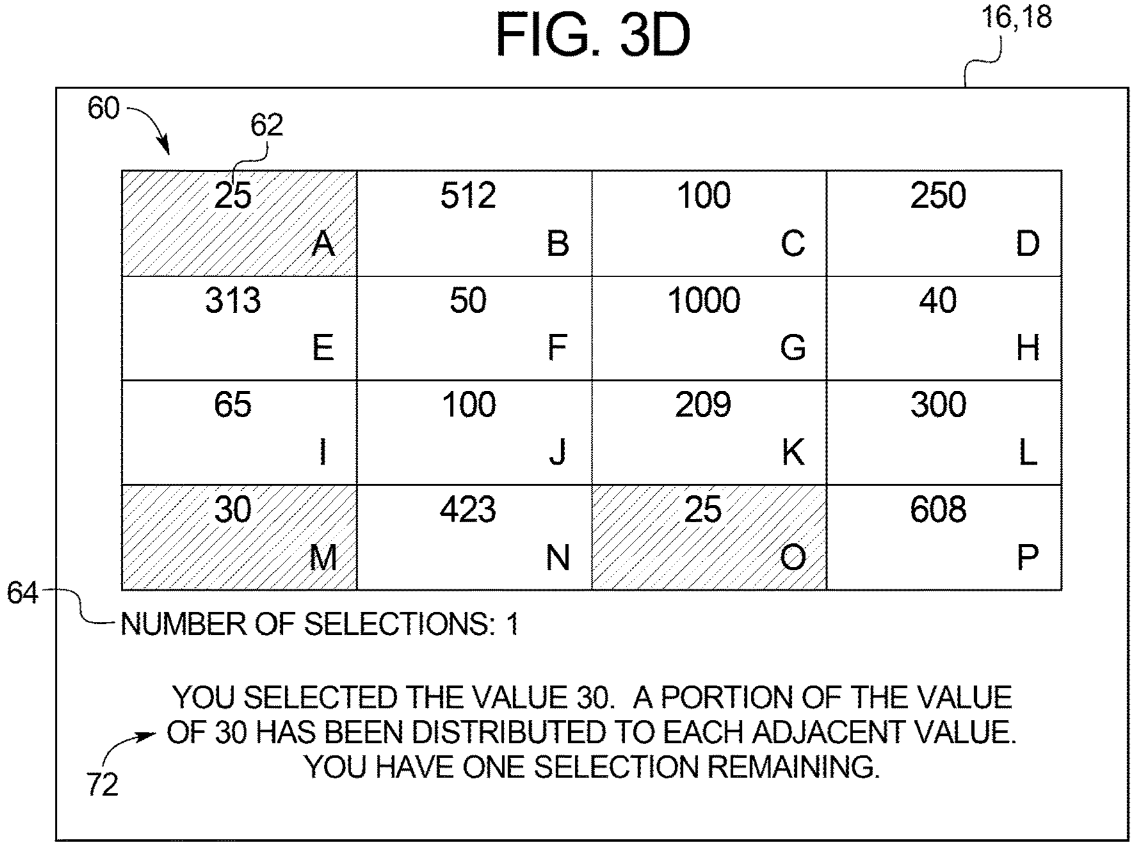

FIG. 3D illustrates the result of the player selecting the value 30 in the cell M. The selection of the value of 30 causes the gaming system to mask cell M to indicate the value 30 has been selected and changes the number of selections displayed in the selection remaining display 64 to one. The gaming system displays the result of the distribution of a portion of the selected value 25 to each of the cell values adjacent the selected cell value according to the predefined rule, which requires the gaming system to divide the selected cell value by the number of adjacent cell values which have not been selected and add that result to each adjacent cell value that has not been selected. In this case, there is no cell below or to the left of the selected cell value, thus there are only two adjacent cell values. Accordingly, the gaming system divides the selected cell value of 30 by the number two, and adds that result to each of the adjacent cell values. Dividing the value of 30 by two results in a whole number of 15, thus the gaming system adds 15 to the value in cell N and adds 15 to the value in cell I. As seen, the distribution according to the predefined rule results in the display of new values of 65 and 423 in cells I and N respectively. The gaming system displays a suitable message such as message 72 of, "YOU SELECTED THE VALUE 30. A PORTION OF THE VALUE OF 30 HAS BEEN DISTRIBUTED TO EACH ADJACENT CELL WHICH HAS NOT BEEN SELECTED. YOU HAVE ONE SELECTION REMAINING."

Figure 3E:
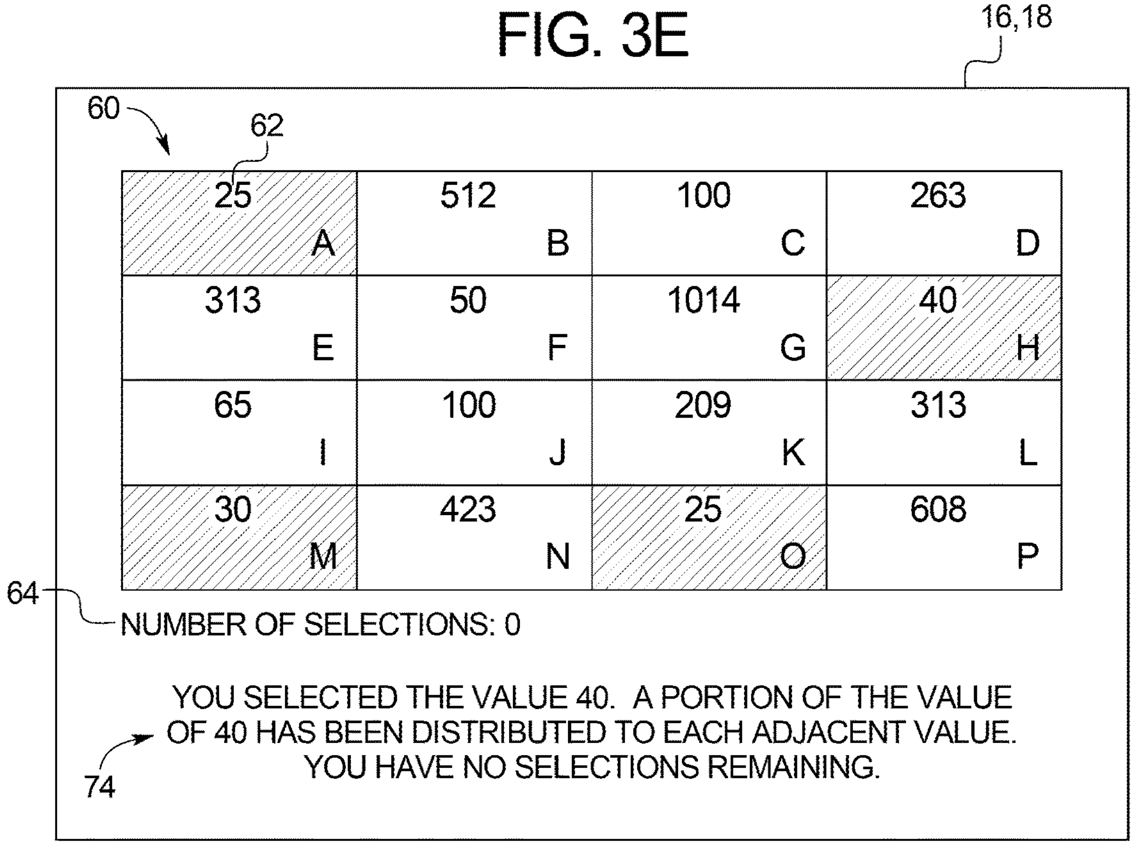

FIG. 3E illustrates the last selection available to the player and the result of the player selecting the value of 40 in cell H. The selection of the value 40 causes the gaming system to mask cell H to indicate the value 40 has been selected and changes the number of selections displayed in the selection remaining display 64 to zero. The gaming system displays the result of the distribution of a portion of the selected value 40 to each of the cell values adjacent the selected cell value according to the predefined rule, which requires the gaming system to divide the selected cell value by the number of adjacent cell values which have not been selected and add that result to each adjacent cell value that has not been selected. In this case, there is no cell value to the right of the selected cell value thus there are only three adjacent cell values. Accordingly, the gaming system divides the selected cell value of 40 by the number three and adds the result to each of the adjacent cell values. Dividing the value of 40 by three does not result in a whole number, thus the gaming system adds 13 to the value in cell D, adds 14 to the value in cell G, and adds 13 to the value in cell L. As seen, the distribution according to the predefined rule results in the display of new values of 263, 1014, and 313 in cells D, G and L respectively. The gaming system displays a suitable message such as message 74 of, "YOU SELECTED THE VALUE 40. A PORTION OF THE VALUE OF 40 HAS BEEN DISTRIBUTED TO EACH ADJACENT CELL WHICH HAS NOT BEEN SELECTED. YOU HAVE NO SELECTIONS REMAINING."

Figure 3F:
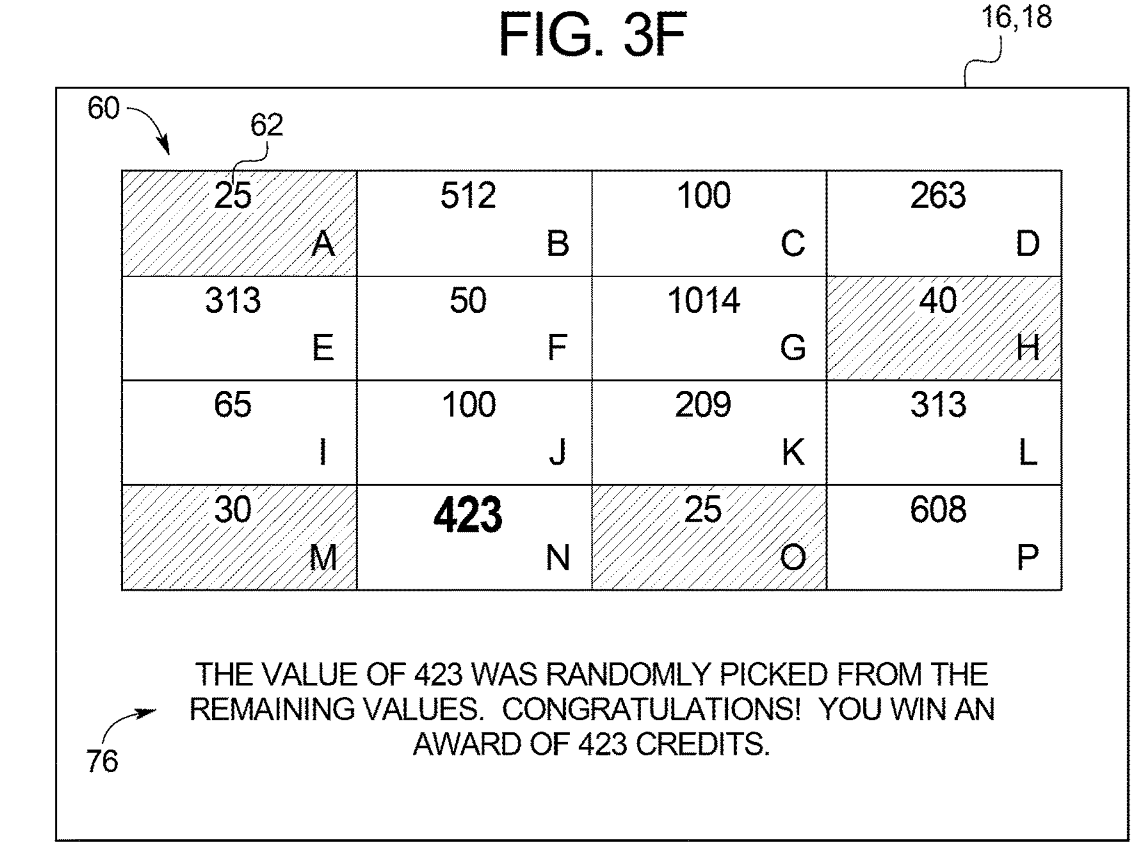

FIG. 3F illustrates the gaming system randomly picking one of the plurality of remaining displayed values which have not been selected to provide an award to the player. In this game, there are twelve remaining displayed values which have not been selected and the gaming system randomly picks the value of 423. The gaming system provides an award to the player of 423 credits and a message 76 of, "THE VALUE OF 423 WAS RANDOMLY PICKED FROM THE REMAINING VALUES. CONGRATULATIONS! YOU WIN AN AWARD OF 423 CREDITS."

Example 2

Referring now to FIGS. 4A to 4F, in this example, the gaming system displays the same arrangement 60 of player selectable values 62 and enables the player to make a selection of four of the displayed values. In the example illustrated by FIGS. 4A to 4F, however, the player employs a different strategy from the example illustrated in FIGS. 3A to 3F. Here, the player decides to select each of the largest values from the displayed arrangement of values in an attempt to achieve a greater average expected award.

Figure 4A:
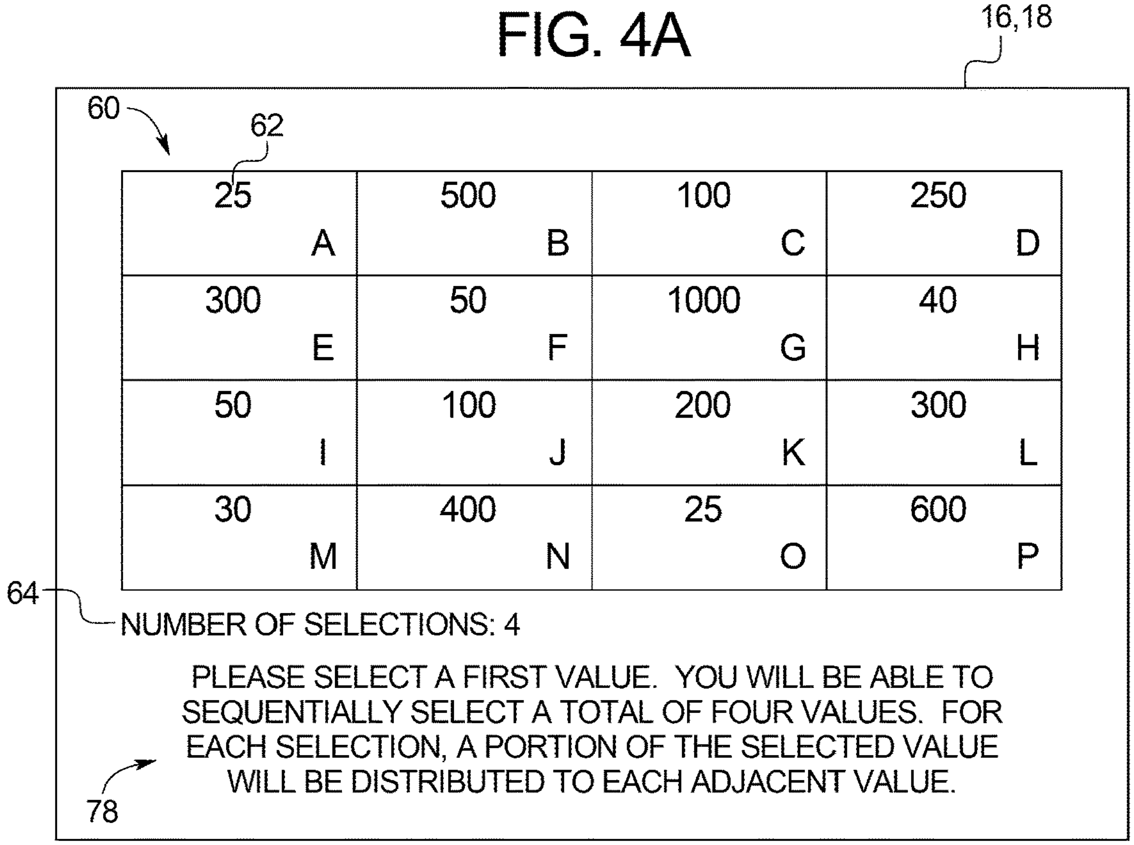
FIGS. 4A, 4B, 4C, 4D, 4E and 4F are front views of a gaming device display enabling a play of a game in accordance with another example of an embodiment of the gaming system disclosed herein.

FIG. 4A illustrates the gaming system displaying on the display device 16, 18 the arrangement 60 of player selectable values 62. The displayed arrangement 60 of values 62 is a matrix having four rows and four columns. The intersection of each row and each column defines individual cells A to P. Each displayed value is associated with one of the individual cells A to P. The gaming system also displays a number of selections of values the player is able to make in the game, as seen by the selections remaining display 64 in the lower left hand corner of the display device 16, 18. The gaming system also displays a suitable visual message to the player to begin the game, such as message 79 of, "PLEASE SELECT A FIRST VALUE. YOU WILL BE ABLE TO SEQUENTIALLY SELECT A TOTAL OF FOUR VALUES. FOR EACH SELECTION, A PORTION OF THE SELECTED VALUE WILL BE DISTRIBUTED TO EACH ADJACENT VALUE."

Figure 4B:
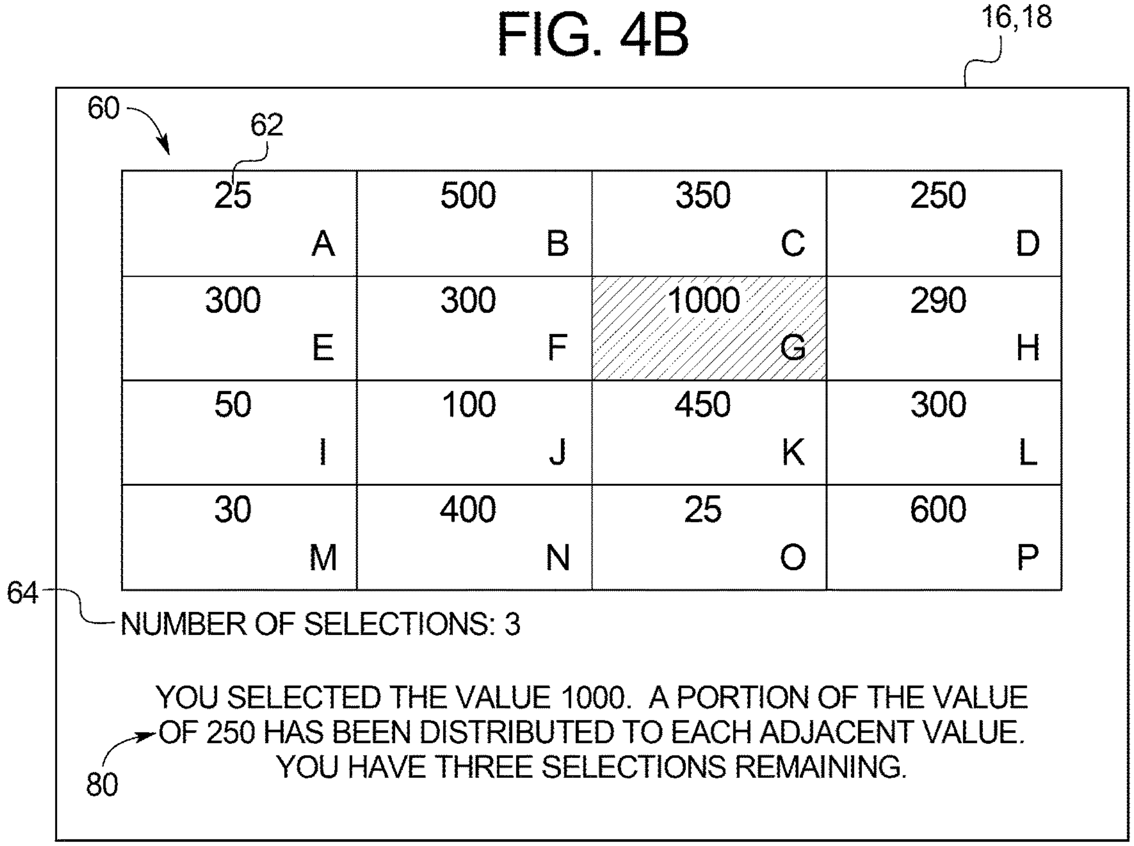

FIG. 4B illustrates the result of the player selecting the value 1000 in cell G. The selection of the value 1000 causes the gaming system to mask the cell associated with the value 1000 to indicate the value 1000 has been selected and to change the number of selections displayed in the selections remaining display 64 to three, indicating the player has only three selections remaining in the game. The gaming system also displays the result of the distribution of a portion of the selected value 1000 to each of the cell values adjacent to the selected cell value according to the predefined rule, which requires the gaming system to divide the selected cell value by the number of adjacent cell values which have not been selected and add that result to each of the adjacent cell values. The adjacent cells are each cell to the left and right of the selected cell value and each cell value above and below the selected cell value. In this case, there are four adjacent cell values. Accordingly, the gaming system divides the selected cell value of 1000 by the number four and adds the result of 250 to each of the adjacent cell values. Thus, the gaming system adds 250 to the values in cells C, H, K and F. As seen, the distribution according to the predefined rule results in the display of new values of 350, 290, 450 and 300 in cells C, H, K and F respectively. The gaming system displays a suitable message such as message 80 of, "YOU SELECTED THE VALUE 1000. A PORTION OF THE VALUE OF 1000 HAS BEEN DISTRIBUTED TO EACH ADJACENT VALUE. YOU HAVE THREE SELECTIONS REMAINING."

Figure 4C:
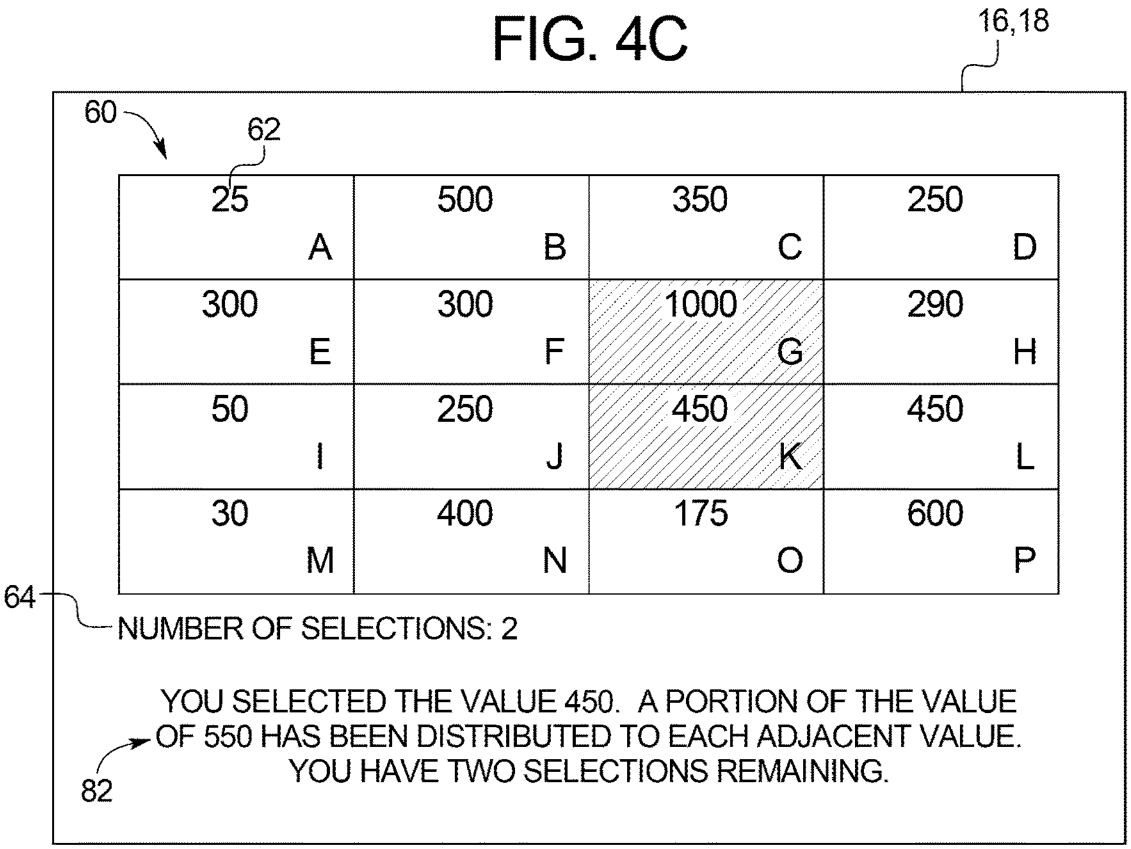

FIG. 4C illustrates the result of the player selecting the value 450 in cell K. The selection of the value 450 causes the gaming system to mask the cell associated with the selected value to indicate the value 450 has been selected and to change the number of selections displayed in the selections remaining display 64 to two. The gaming system displays the result of the distribution of a portion of the selected value of 450 to each of the cell values adjacent the selected cell value according to the predefined rule, which requires the gaming system to divide the selected cell value by the number of adjacent cell values which have not been selected and add that result to each adjacent cell value that has not been selected. In this case, the cell above the selected cell value has already been selected thus there are only three adjacent cell values. Accordingly, the gaming system divides the selected cell value of 450 by the number three and adds the result to each of the adjacent cell values. Thus the gaming system adds 150 to cell L, adds 150 to the cell J and adds 150 to the value in cell 0. As seen, the distribution according to the predefined rule results in the display of new values of 250, 175, and 450 in the cells J, O and L respectively. The gaming system displays a suitable message such as message 82 of, "YOU SELECTED THE VALUE 450. A PORTION OF THE VALUE OF 450 HAS BEEN DISTRIBUTED TO EACH ADJACENT VALUE. YOU HAVE TWO SELECTIONS REMAINING."

Figure 4D:
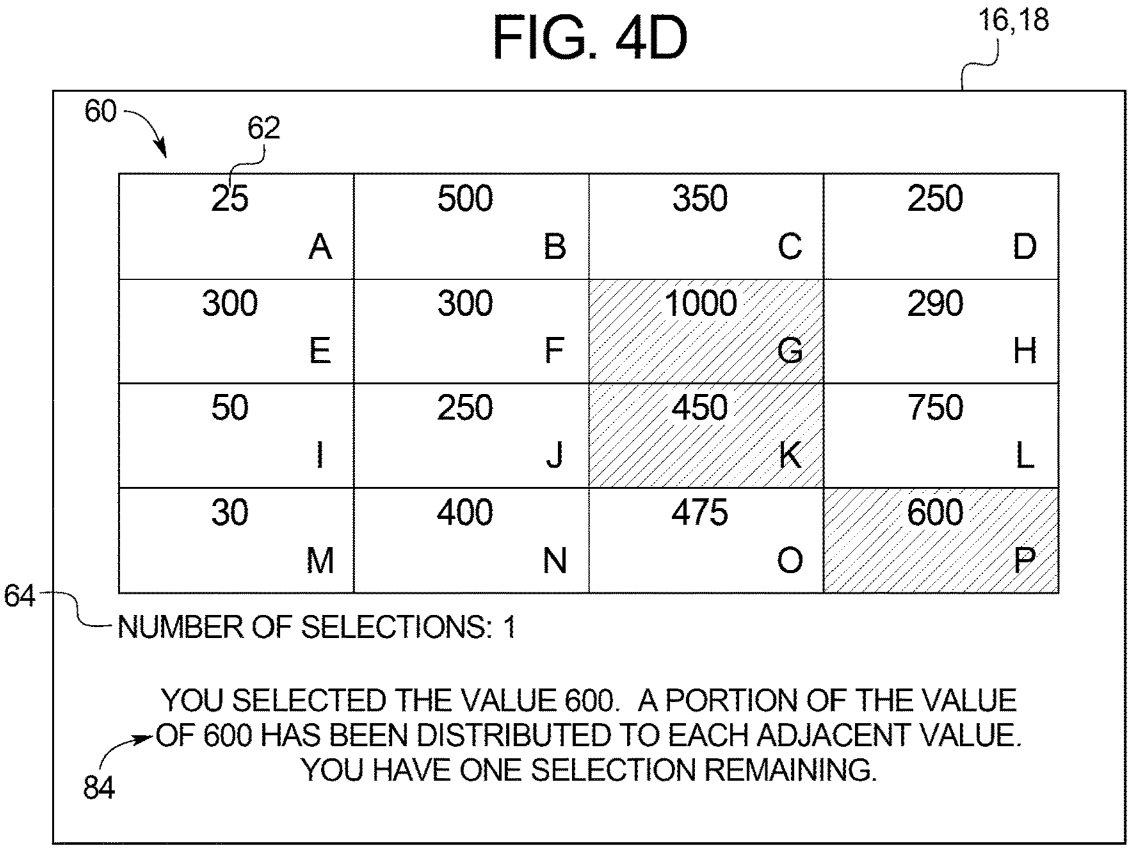

FIG. 4D illustrates the result of the player selecting the value 600 in cell P. As seen, the selection of the value 600 causes the gaming system to mask cell P to indicate the value 600 has been selected and to change the number of selections displayed in the selection remaining display 64 to one. The gaming system displays the result of the distribution of a portion of the selected value 600 to each of the cell values adjacent the selected cell value according to the predefined rule, which requires the predefined rule to divide the selected cell value by the number of adjacent cell values which have not been selected and add that result to each adjacent cell value that has not been selected. In this case, there is no cell below the selected cell value and no cell to the right of the selected cell value thus there are only two adjacent cell values. Accordingly, the gaming system divides the selected cell value of 600 by the number two and adds the result of 300 to the values in cell L and cell 0. As seen, the distribution of the selected cell value according to the predefined rule results in the display of new values of 750 and 475 in the cells L and O respectively. The gaming system display a suitable message such as message 84 of, "YOU SELECTED THE VALUE 600. A PORTION OF THE VALUE OF 600 HAS BEEN DISTRIBUTED TO EACH ADJACENT VALUE."

Figure 4E:
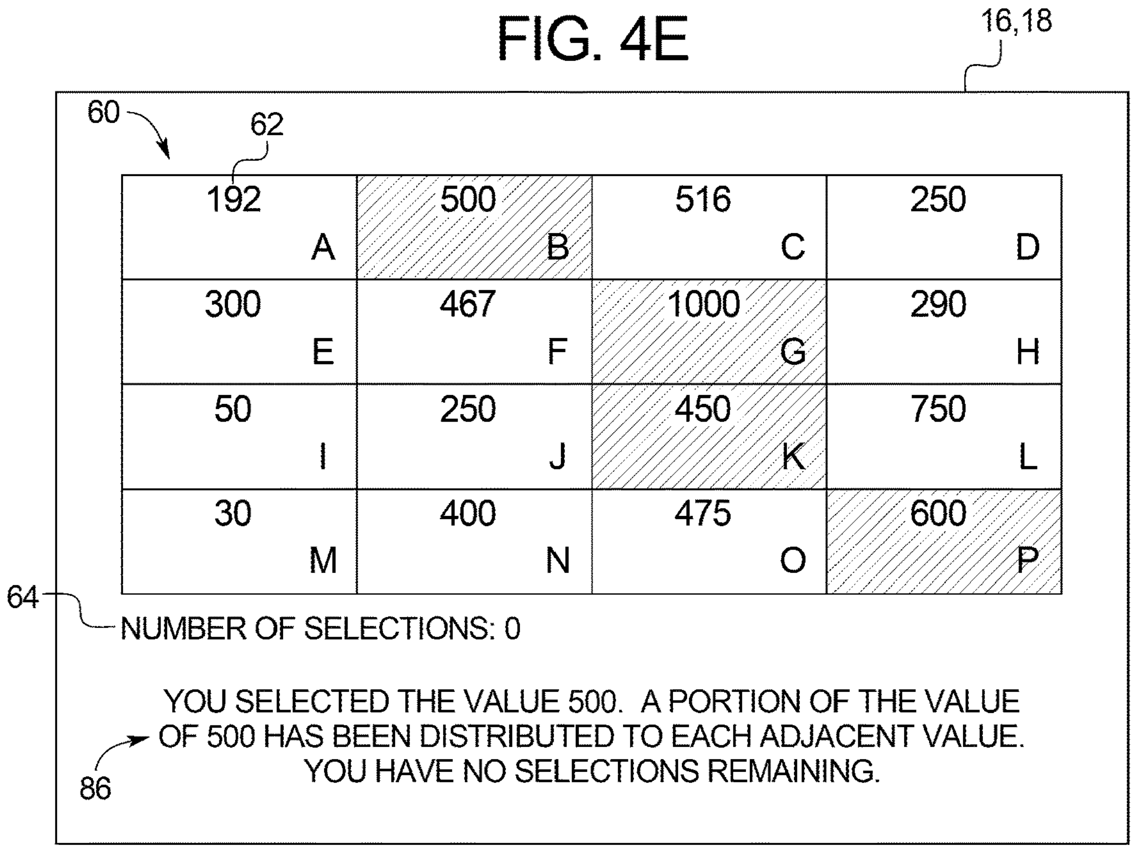

FIG. 4E illustrates the last selection available to the player and the result of the player making the last selection of the value of 500 in cell B. The selection of the value 500 causes the gaming system to mask cell B to indicate the value of 500 has been selected and to change the number of selections displayed in the selection remaining display 64 to zero. The gaming system displays the result of the distribution of a portion of the selected value of 500 to each of the cell values adjacent the selected cell value according to the predefined rule, which requires the gaming system to divide the selected cell value by the number of adjacent cell values which have not been selected and add that result to each adjacent cell value that has not been selected. In this case, there is no cell value above the selected cell value thus there are only three adjacent cell values. Accordingly, the gaming system divides the selected cell value of 500 by the number three and adds the result to values in cells A, C and F. Dividing the value of 500 by three does not result in a whole number, thus the gaming system adds 167 to cell A and F, and adds 166 to cell C. As seen, the distribution according to the predefined rule results in the display of new values of 192, 467, and 516 in cells A, F and C respectively. The gaming system displays a suitable message such as message 86 of, "YOU SELECTED THE VALUE 500. A PORTION OF THE VALUE OF 500 HAS BEEN DISTRIBUTED TO EACH ADJACENT VALUE. YOU HAVE NO SELECTIONS REMAINING."

Figure 4F:
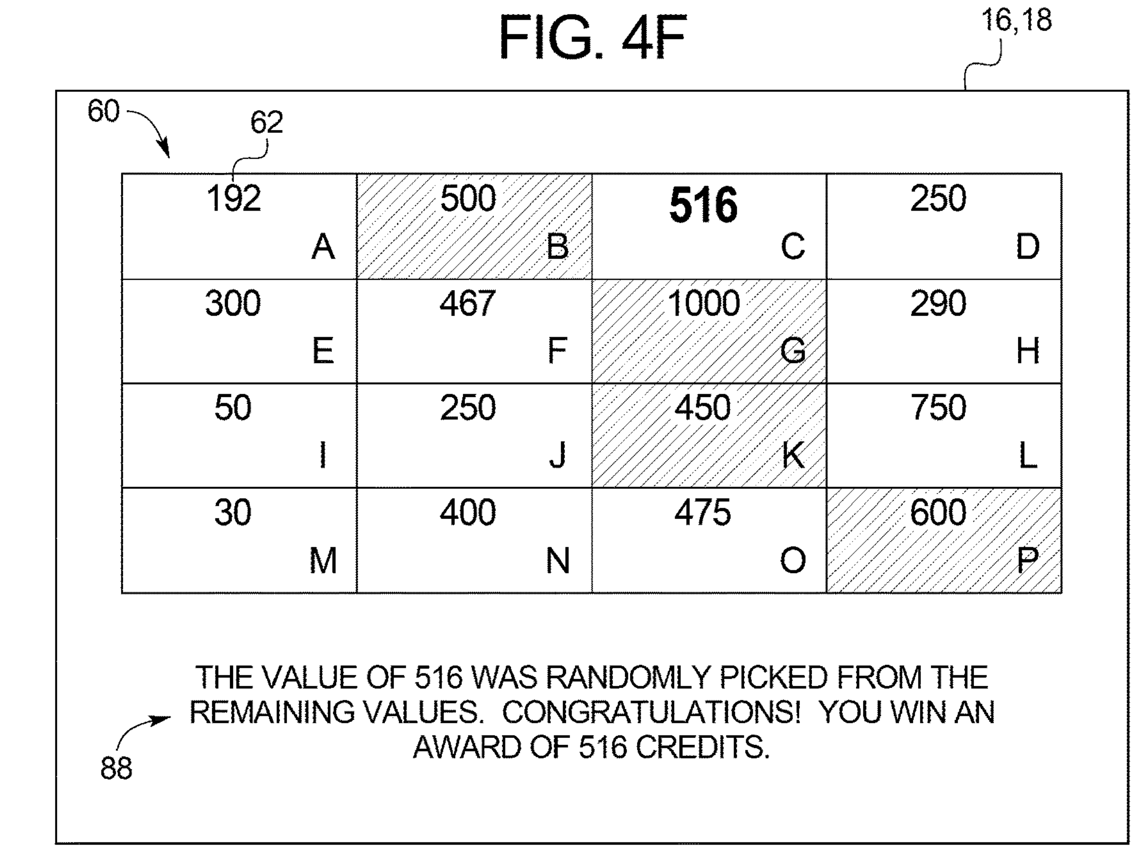

FIG. 4F illustrates the gaming system randomly picking one of the plurality of remaining displayed values which have not been selected to provide an award to the player. In this game, there are twelve remaining displayed values which have not been selected. The gaming system randomly picks the value of 516. The gaming system provides an award to the player of 516 credits and a message 88 of, "THE VALUE OF 516 WAS RANDOMLY PICKED FROM THE REMAINING VALUES. CONGRATULATIONS! YOU WIN AN AWARD OF 516 CREDITS."

Referring now to FIGS. 5A to 5F, in this example, the gaming system displays the same arrangement 60 of values 62 and enables the player to make a selection of four of the displayed values. In the example illustrated by FIGS. 5A to 5F, however, the player employs a different strategy from both the example illustrated in FIGS. 3A to 3F and the example illustrated in FIGS. 4A to 4F. Here the player selects values in an attempt to create the largest possible value from the remaining values from which the gaming system will randomly pick to provide an award. That is, the player is attempting to create one large value.

Figure 5A:
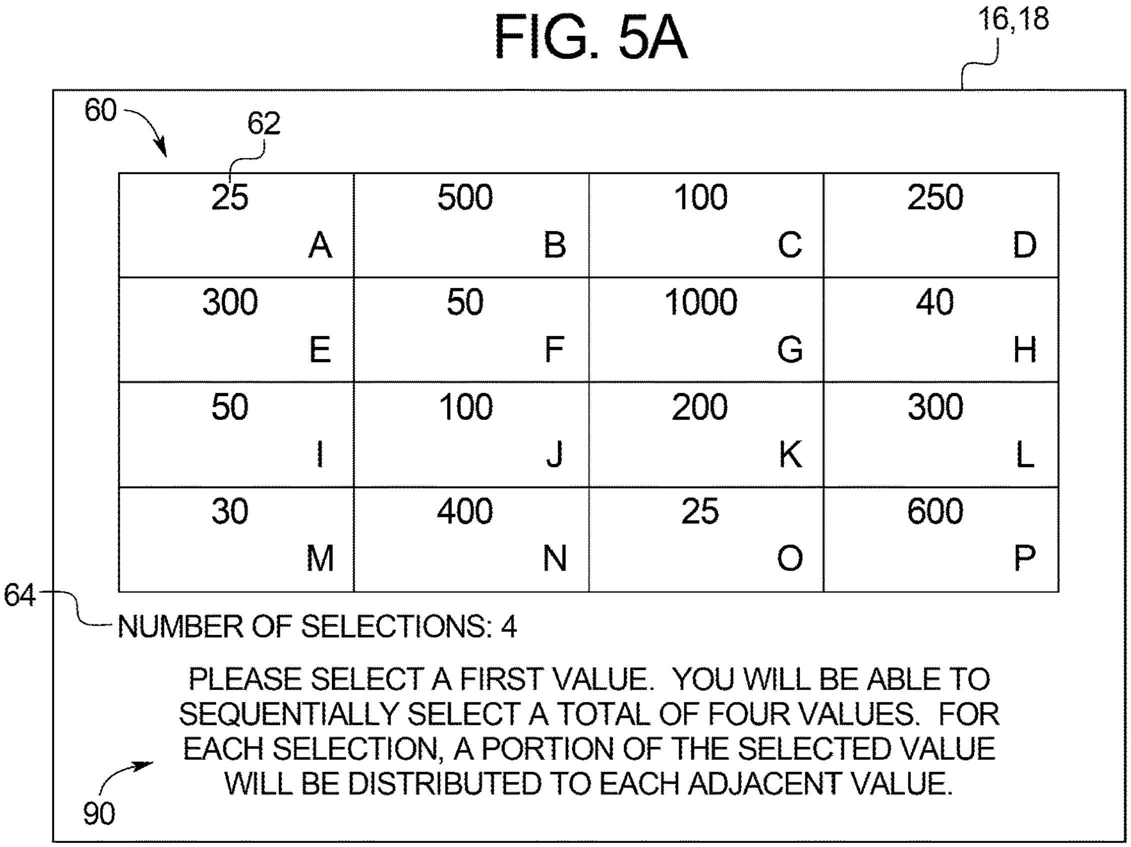
FIGS. 5A, 5B, 5C, 5D, 5E and 5F are front views of a gaming device display enabling a play of a game in accordance with another example of an embodiment of the gaming system disclosed herein.

FIG. 5A illustrates the gaming system displaying on display device 16, 18 the arrangement 60 of player selectable values 62. The displayed arrangement 60 of values 62 is a matrix having four rows and four columns. The intersection of each row and each column defines individual cells A to P. Each displayed value is associated with one of the individual cells A to P. The gaming system also displays a number of selections of values the player is able to make in the game, as seen by the selections remaining display 64 in the lower left hand corner of the display device 16, 18. The gaming system also displays a suitable visual message to begin the game, such as message 90 of, "PLEASE SELECT A FIRST VALUE. YOU WILL BE ABLE TO SEQUENTIALLY SELECT A TOTAL OF FOUR VALUES. FOR EACH SELECTION, A PORTION OF THE SELECTED VALUE WILL BE DISTRIBUTED TO EACH ADJACENT VALUE."

Figure 5B:
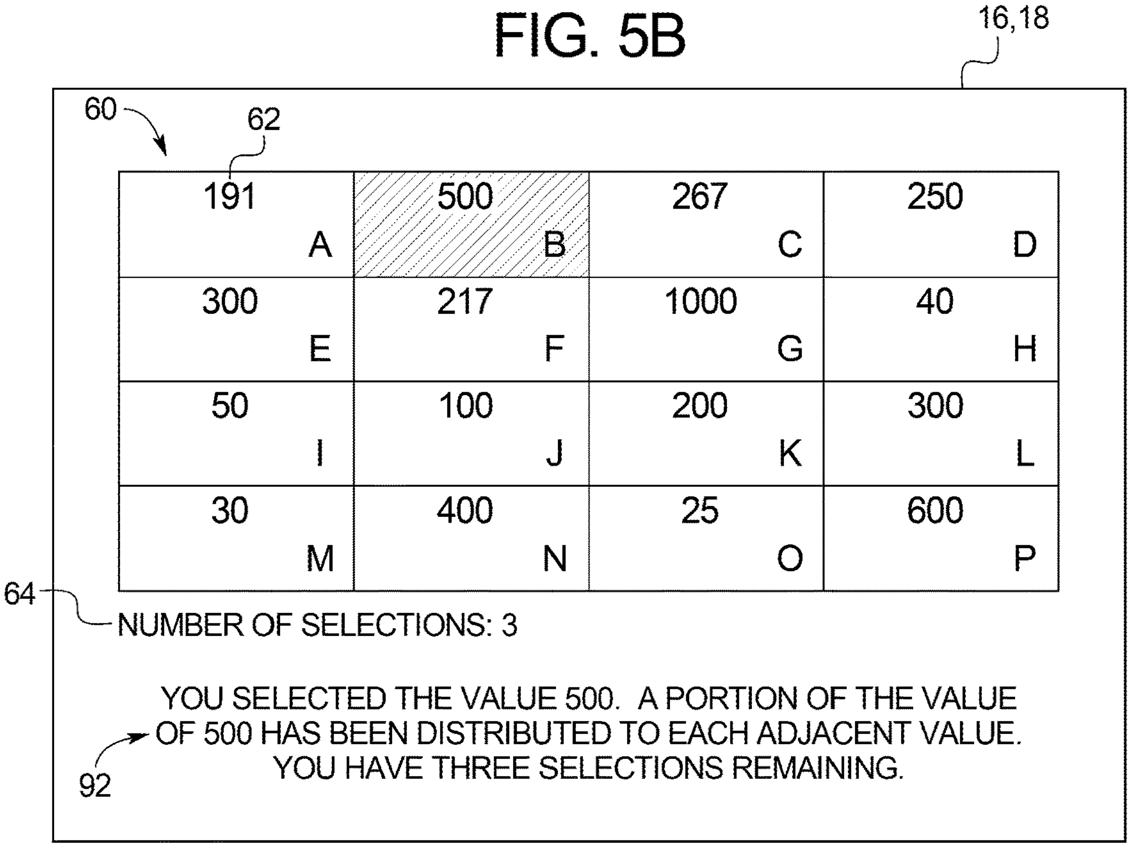

FIG. 5B illustrates the result of the player selecting the value 500 in cell B. The result of selecting the value 500 causes the gaming system to mask cell B to indicate the value 500 has been selected and to change the number of selections displayed in the selections remaining display 64 to three, indicating the player has only three selections remaining in the game. The gaming system also displays the result of the distribution of a portion of the selected value 500 to each of cell values adjacent to the selected cell value according to the predefined rule, which requires the gaming system to divide the selected cell value by the number of adjacent cell values which have not been selected and add that result to each of the adjacent cell values. The adjacent cells are each cell to the left and right of the selected cell value and each cell value above and below the selected cell value. In this case, there are three adjacent cell values. Accordingly, the gaming system divides the selected cell value of 500 by the number three and adds the result to each of the adjacent cell values. Dividing the value of 500 by three does not result in a whole number, thus the gaming system adds 167 to value in cell C, adds 167 to the value in cell F, and adds 166 to the value in cell A. As seen, the distribution according to the predefined rule results in the display of new values of 191, 217, and 267 in cells A, F and C respectively. The gaming system displays a suitable message such as message 92 of, "YOU SELECTED THE VALUE 500. A PORTION OF THE VALUE OF 500 HAS BEEN DISTRIBUTED TO EACH ADJACENT VALUE. YOU HAVE THREE SELECTIONS REMAINING."

Figure 5C:
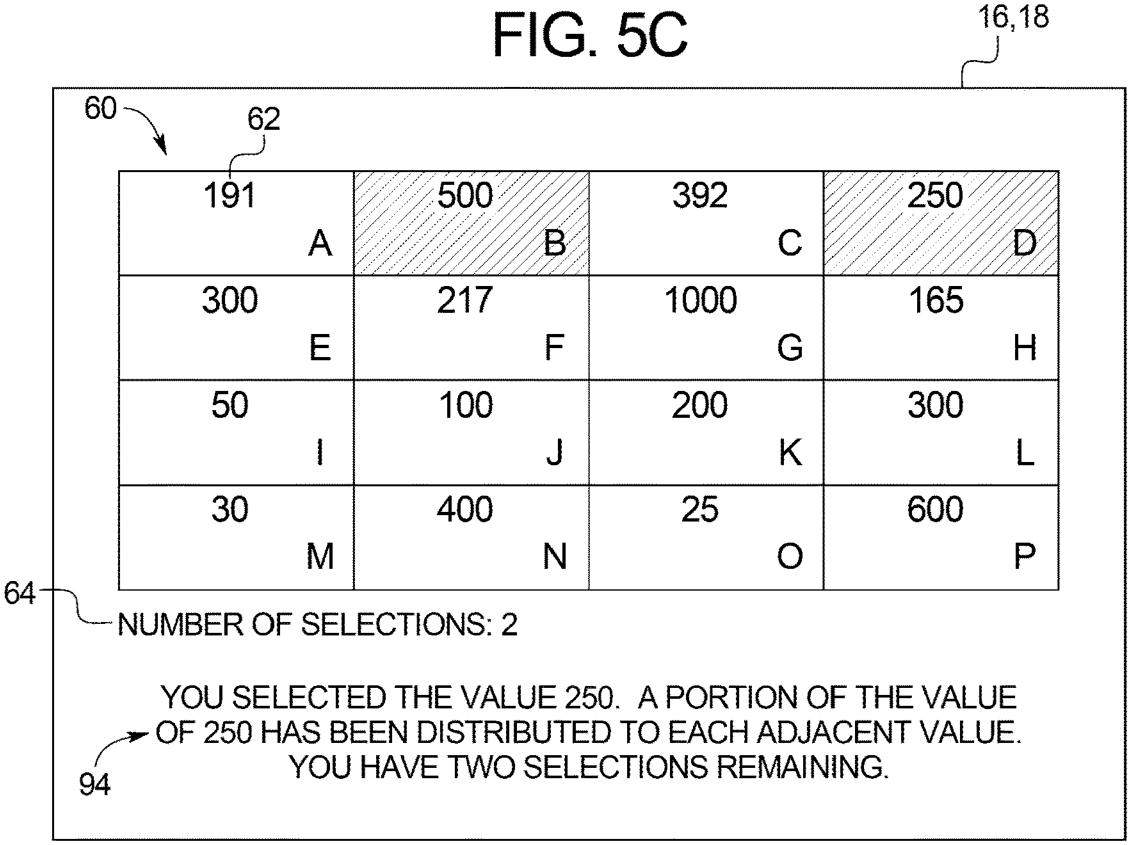

FIG. 5C illustrates the result of the player selecting the value 250 in cell D The selection of the value 250 causes the gaming system to mask cell D to indicate the value 250 has been selected and to change the number of selections displayed in the selection remaining display 64 to two. The gaming system displays the result of the distribution of a portion of the selected value of 250 to each of the cell values adjacent the selected cell value according to the predefined rule, which requires the gaming system to divide the selected cell value by the number of adjacent cell values which have not been selected and add that result to each adjacent cell value that has not been selected. In this case, there is no cell above the selected cell value or to the right of the selected cell value. Accordingly, the gaming system divides the selected cell value of 250 by the number two and adds the result of 125 to each of the adjacent cell values. As seen, the distribution according to the predefined rule results in the display of new values of 392 and 165 in cells C and H respectively. The gaming system displays a suitable message such as message 94 of, "YOU SELECTED THE VALUE 250. A PORTION OF THE VALUE OF 250 HAS BEEN DISTRIBUTED TO EACH ADJACENT VALUE. YOU HAVE TWO SELECTIONS REMAINING."

Figure 5D:
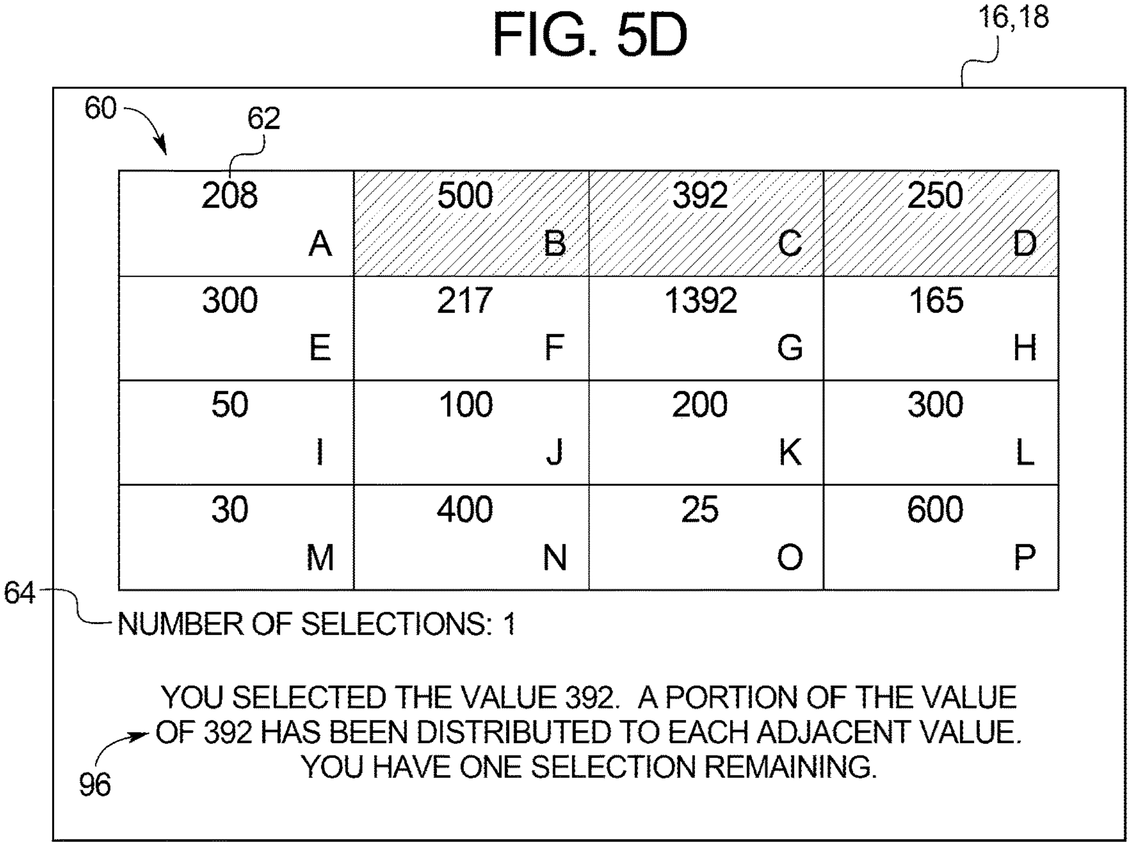

FIG. 5D illustrates the result of the player selecting the value 392 in cell C. The selection of the value 392 causes the gaming system to mask cell C to indicate the value 392 has been selected and to change the number of selections displayed in the selection remaining display to one. The gaming system displays the result of the distribution of a portion of the selected value of 392 to each of the cell values adjacent the selected cell value according to the predefined rule, which requires the gaming system to divide the selected cell value by the number of adjacent cell values which have not been selected and add that result to each adjacent cell value that has not been selected. In this case, there is no cell above the selected cell value and the cells to the left and right of the selected cell value have already been selected, thus there is only one adjacent cell value. Accordingly, the gaming system divides the selected cell value of 392 by the number one and adds the result of 392 to value in the only adjacent cell G. As seen, the distribution of the selected cell value according to the predefined rule results in the display of a new value of 1392 in cell G. The gaming system displays a suitable message such as message 96 of, "YOU SELECTED THE VALUE 392. A PORTION OF THE VALUE OF 392 HAS BEEN DISTRIBUTED TO EACH ADJACENT VALUE. YOU HAVE ONE SELECTION REMAINING."

Figure 5E:
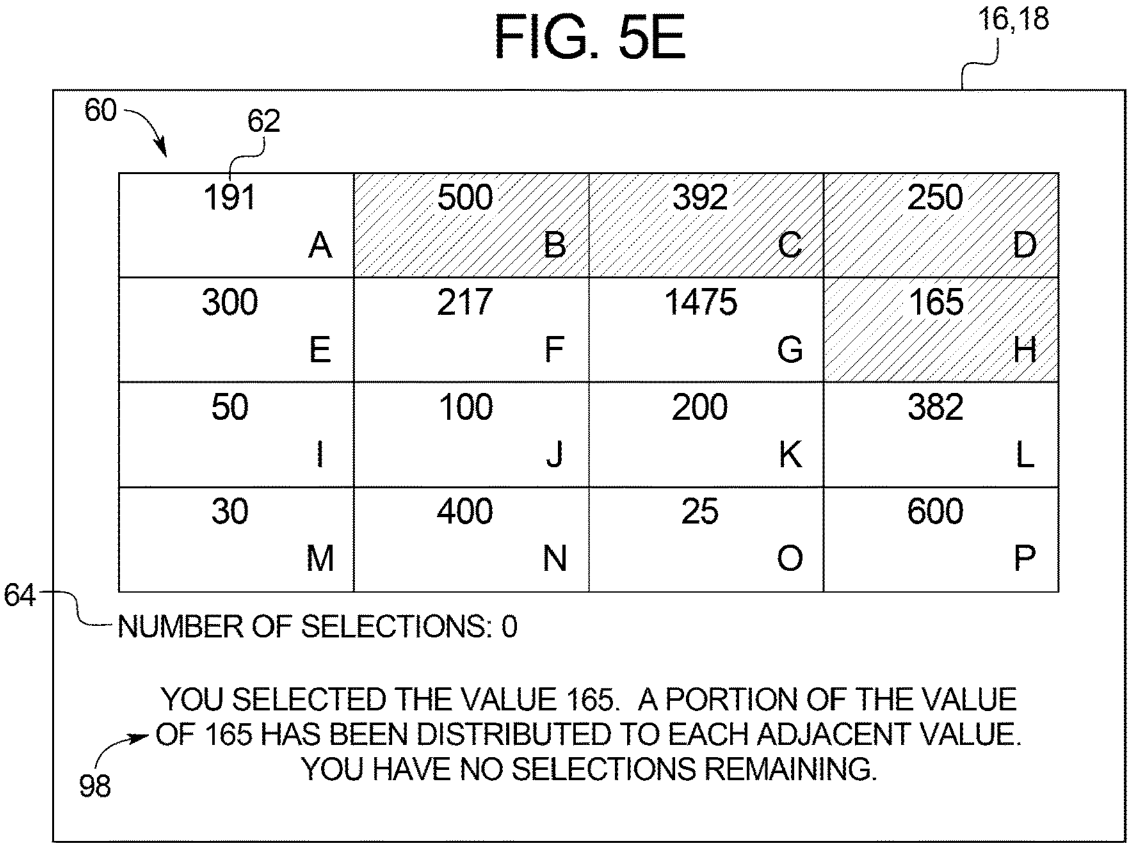

FIG. 5E illustrates the last selection available to the player and the result of the player making the last selection of the value of 165 in cell H. Here the player knew that there was only one cell adjacent to the 165 value so half of the 165 value would be distributed to the adjacent cells and therefore be the best strategy for creating the largest remaining value. The selection of the value 165 causes the gaming system to mask cell H to indicate the value of 165 has been selected and to change the number of selections displayed in the selection remaining display 64 to zero. The gaming system displays the result of the distribution of a portion of the selected value of 165 to each of the cell values adjacent the selected cell value according to the predefined rue, which requires the gaming system to divide the selected cell value by the number of adjacent cell values which have not been selected and add that result to each adjacent cell value that has not been selected. In this case, there is no cell value to the right of the selected cell value and the cell value above the selected cell value has already been selected, thus there are only two adjacent cell values. Accordingly, the gaming system divides the selected cell value of 165 by the number two and adds the result to each of the adjacent cell values. Dividing the value of 165 by two does not result in a whole number, thus the gaming system adds 82 to cell L, and adds 83 to the cell G. As seen, the distribution according to the predefined rule results in the display of new values of 1475 and 382 in cells G and L respectively. The gaming system displays a suitable message such as message 98 of, "YOU SELECTED THE VALUE 165. A PORTION OF THE VALUE OF 165 HAS BEEN DISTRIBUTED TO EACH ADJACENT VALUE. YOU HAVE NO SELECTIONS REMAINING."

Figure 5F:
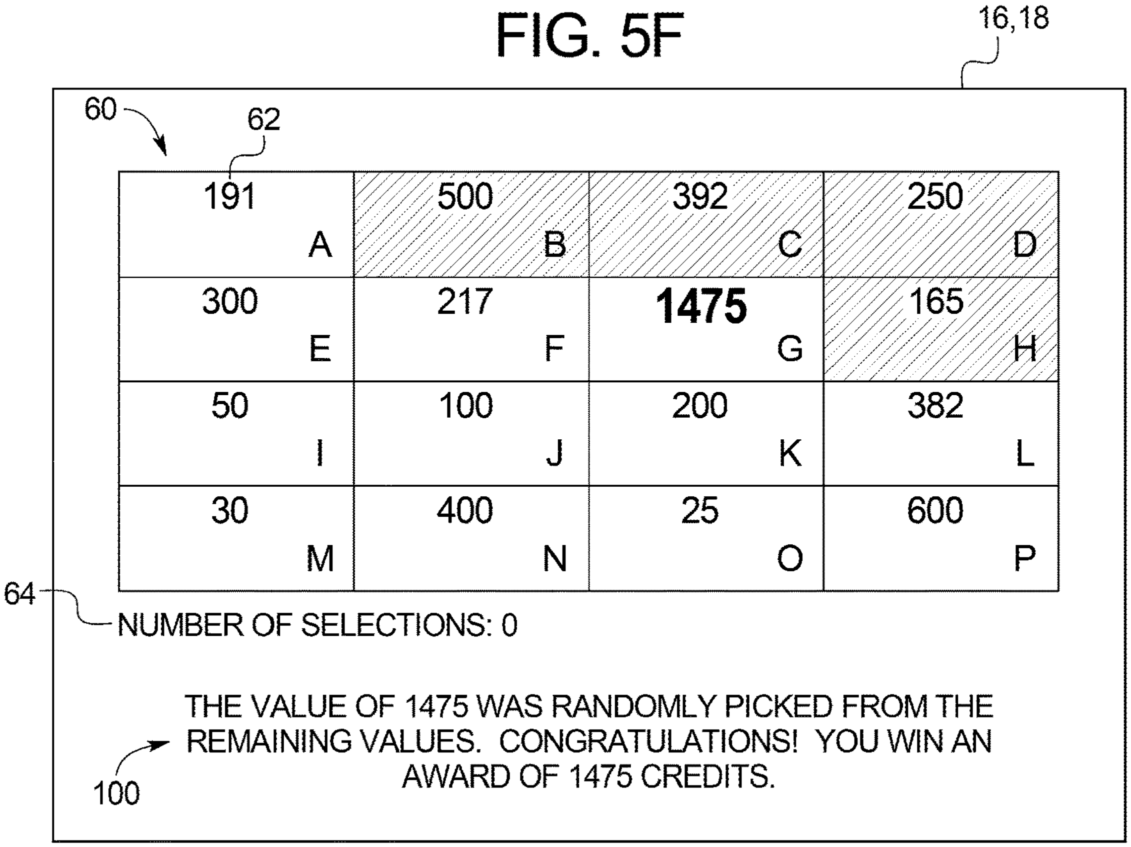

FIG. 5F illustrates the gaming system randomly picking one of the plurality of remaining displayed values which have not been selected to provide an award to the player. As seen, in this game there are twelve remaining displayed values which have not been selected. The gaming system randomly picks the value of 1475. The gaming system provides an award to the player of 1475 credits and a message 100 of, "THE VALUE OF 1475 WAS RANDOMLY PICKED FROM THE REMAINING VALUES. CONGRATULATIONS! YOU WIN AN AWARD OF 1475 CREDITS."

It should be appreciated that in various example embodiments, the gaming system does not allow a player to select a value in which each of the values adjacent to that value have already been selected. For example, in the arrangement 60 illustrated in FIGS. 3A to 3F, 4A to 4F, and 5A to 5F above, if a player has selected the value in cell B and selected the value in cell E, the gaming system does not allow the player to select the value in cell A because the two adjacent values (i.e, the values in cells B and E) have already been selected. In various other embodiments, the gaming system enables the player to select a value in which each of the values adjacent to that value have already been selected. In one such embodiment, if the player selects the value in which each of the values adjacent to that value have already been selected, the gaming system provides the player with an award based at least in part on the value of that value. In another such embodiment, the gaming system distributes at least a portion of the selected value to one or more of the other values which have not been selected according to one of the predefined rules as described in more detail below.

Table 102 of FIG. 6A shows average and standard deviation for the twelve remaining values displayed for each of the example games discussed above. In Example game 3, the player employed a strategy of selecting values in an attempt to achieve the largest possible remaining value from which the gaming system picks an award. This strategy allowed the player to take a greater risk, as illustrated by the large standard deviation of 399 shown in Table 102. In Example game 1, the player attempted to remove the all of the smallest values to reduce the chance of obtaining a smaller award. This strategy enabled the player to take less risk than example game 1, as illustrated by the lower standard deviation of 280 shown in Table 102 relative to Example game 3. In Example game 2, the player tried to select all of the largest values in an attempt to achieve the largest possible average award. Applying this strategy, the player took the least amount of risk, as illustrated by Table 102, which shows the player achieving the lowest standard deviation of 204 among the three Example games.

Despite the different strategies employed by the player in each example game, the average (i.e., the average expected payout) of each game is the same. However, as discussed above, the standard deviation (which is a measurement of volatility) for each game is radically different. Thus, it should be appreciated that the gaming system of the present invention enables the player to successfully control the volatility in each example game by employing different selection strategies. This ability to control volatility enhances the player's enjoyment and increases the player's excitement.

FIGS. 7A to 7F illustrate another embodiment of the present disclosure. In this embodiment, the gaming system provides a game that initially displays an arrangement 104 of player selectable cells A to P. Each of the cells are associated with a value that is initially hidden from the player's view. The gaming system provides the player with a determined number of cell selections. For each cell selection, a portion of the value associated with the cell is distributed to the cells adjacent to the selected cell according to a predefined rule. The gaming system also determines and provides an award for each selection of a cell based in part on the selected cell value and the result of the predefined rule.

Figure 7A:
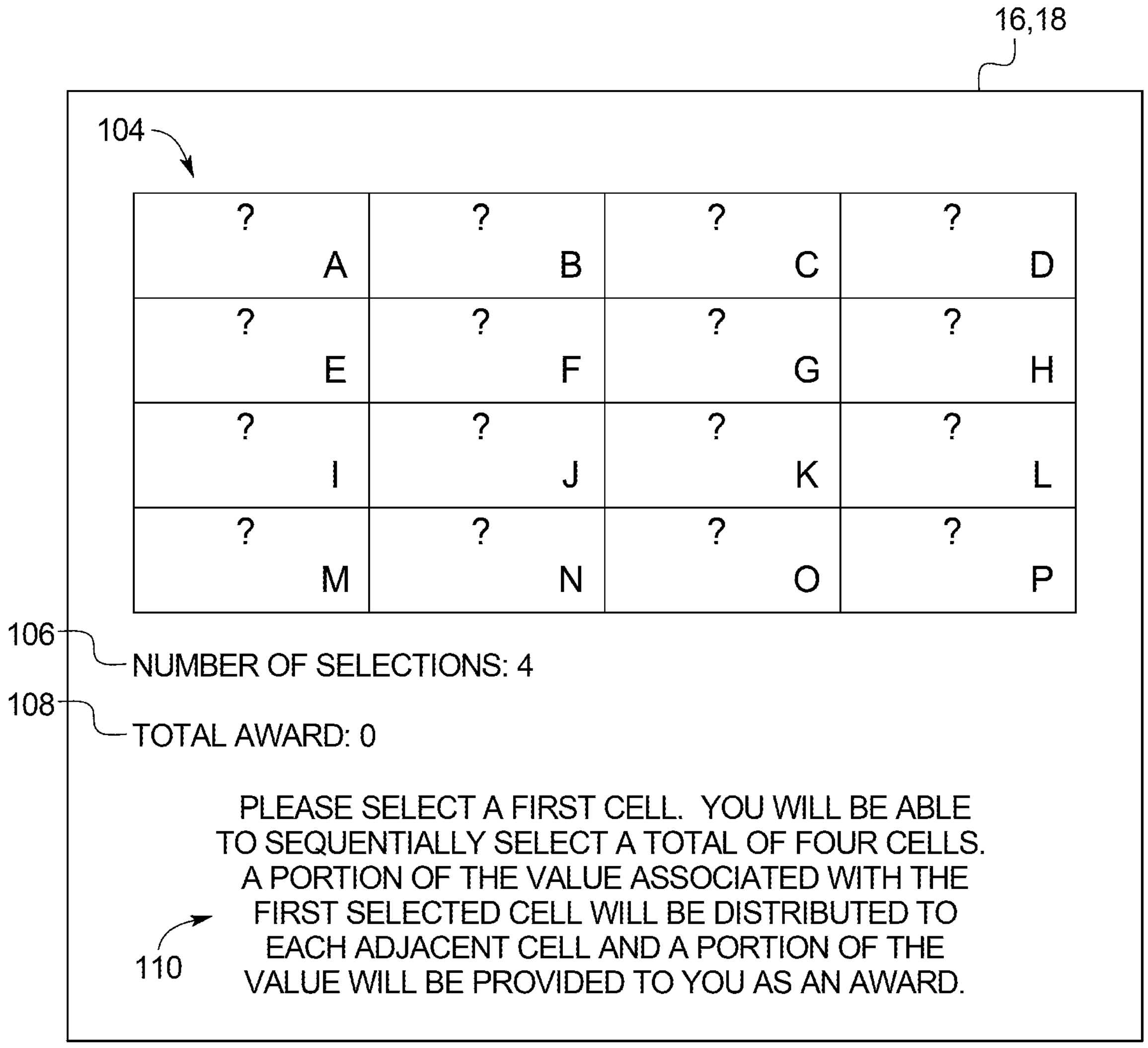

FIG. 7A illustrates the gaming system displaying on the display device 16, 18 an arrangement 104 of player selectable cells A to P. The displayed arrangement 104 of cells is a matrix having four rows and four columns. The intersection of each row and each column defines the selectable cells A to P and each selectable cell is associated with a particular value. The value associated with each selectable cell A to P is not displayed. The gaming system displays the number of cell selections the player is able to make in the game, as seen by the selections remaining display 106 in the lower left hand corner of the display device 16, 18. The gaming system also displays a total award won display 108 below the selections remaining display 86 in the lower left hand corner and to display a suitable visual message to the player to select a cell, such as message 110 of, "PLEASE SELECT A CELL. YOU WILL BE ABLE TO SEQUENTIALLY SELECT FOUR CELLS. A PORTION OF THE VALUE ASSOCIATED WITH THE FIRST SELECTED CELL WILL BE DISTRIBUTED TO EACH ADJACENT CELL AND A PORTION OF THE VALUE WILL BE PROVIDED TO YOU AS AN AWARD."

Figure 7B:
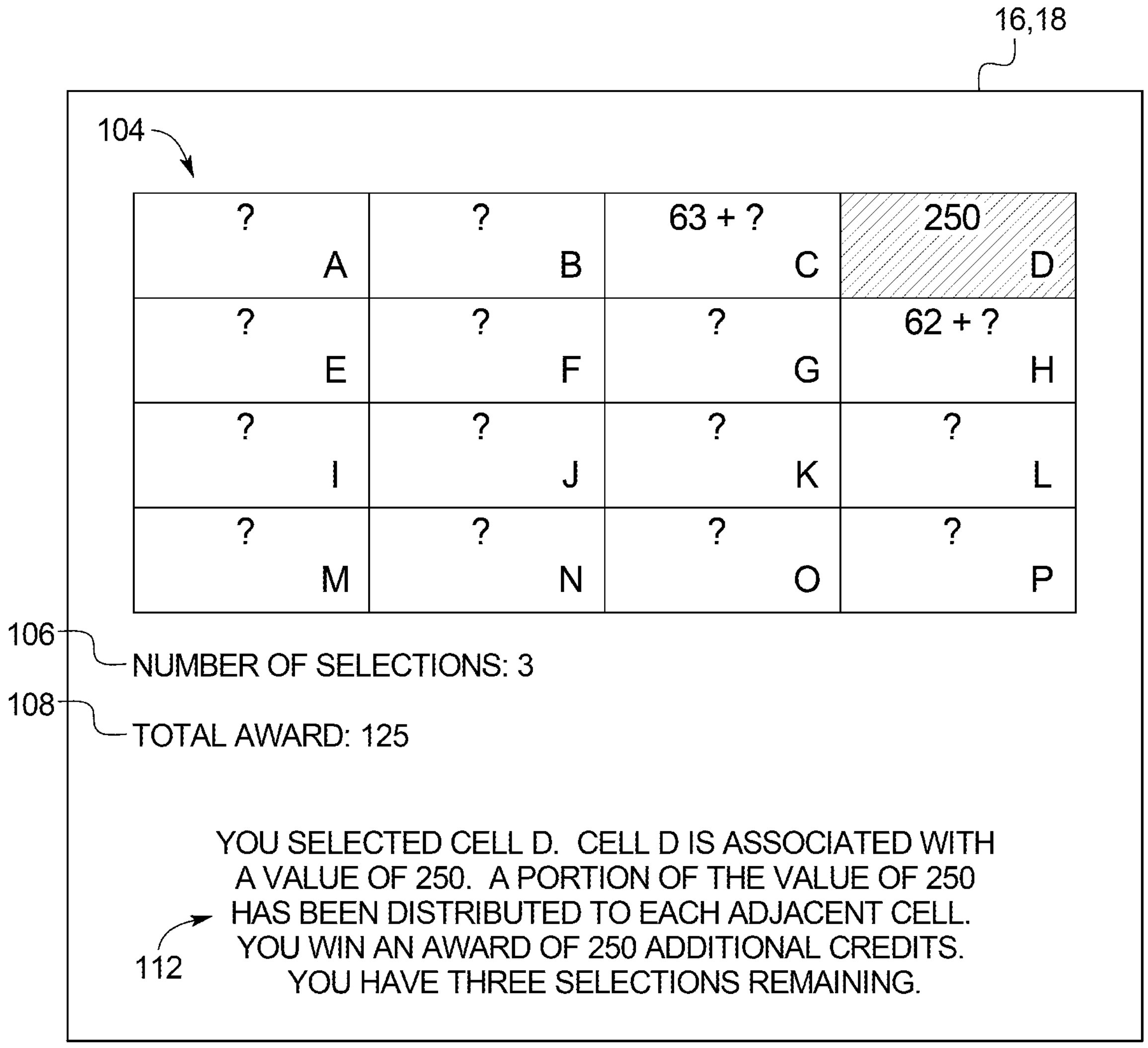

FIG. 7B illustrates the result of the player selecting cell D. The selection of cell D causes the gaming system to mask cell D to indicate the cell has been selected and to change the number of selections displayed in the selections remaining display 106 to three, indicating the player has only three selections remaining in the game. The gaming system also displays the result of the distribution of a portion of the value associated with the selected cell in each of cells adjacent to the selected cell according to a predefined rule, which requires the gaming system to divide the value associated with the selected cell by two times the number of adjacent cell values which have not been selected and causes that result to be displayed in each of the adjacent cell values. In this case, there are two adjacent cells, one cell to the left and one cell below the selected cell, and the value associated with the cell is 250. Accordingly, the gaming system divides the value of 250 by the number four (i.e., two times the two adjacent cells) and displays the result of 63 in each of the adjacent cells. The gaming system also determines an award based in part on the predefined rule and provides the determined award to the player. That is, the gaming system divides the value of 250 by two and provides an award of 125 credits, as indicated by the total award won display 108. The gaming system displays a suitable message such as message 112, "YOU SELECTED CELL D. A PORTION OF THE VALUE OF 250 ASSOCIATED WITH CELL D HAS BEEN DISTRIBUTED TO EACH ADJACENT CELL. YOU WIN AN AWARD OF 125 ADDITIONAL CREDITS. YOU HAVE THREE SELECTIONS REMAINING."

Figure 7C:
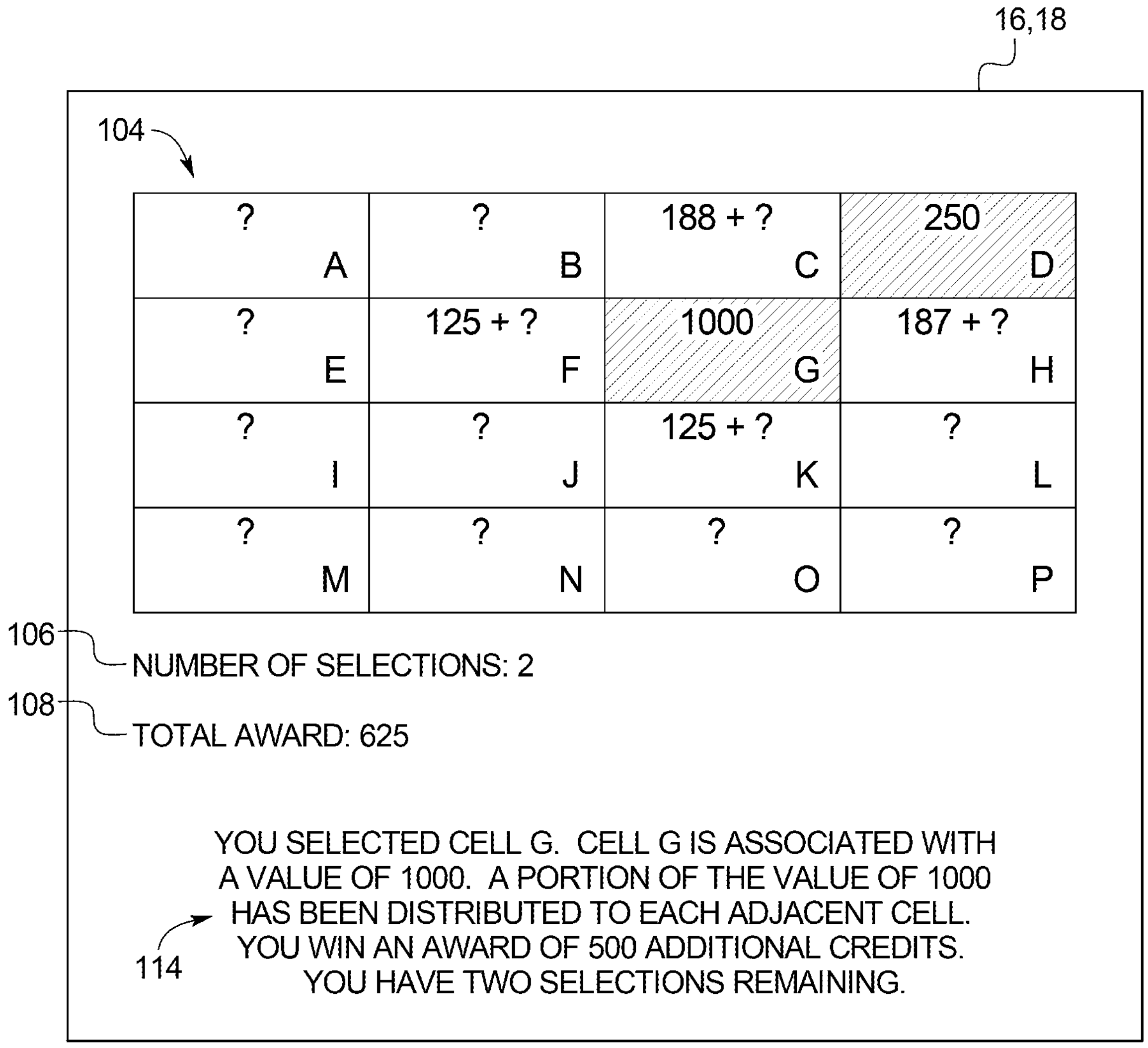

The player is now faced with an interesting decision. If the player selects the cell with the value 63 displayed, the gaming system will provide an award of 63 plus at least a portion of the value associated with the cell in which the value 63 is displayed. As illustrated in FIG. 7C, however, the player decides to select a different cell.

FIG. 7C illustrates the result of the player selecting cell G. The selection of this cell causes the gaming system to mask cell G to indicate the cell has been selected and to change the number of selections displayed in the selections remaining display 106 to two, indicating the player has only two selections remaining in the game. For each cell adjacent to the selected cell which does not display a value, the gaming system distributes a portion of the value associated with the selected cell to each adjacent cell which has not been selected according to the predefined rule, and displays the value resulting from the distribution in each of the adjacent cells. In this case, there are two adjacent cells which do not display a value (i.e., cell K and cell F, as seen in FIG. 7B), and the value associated with the selected cell is 1000. Accordingly, the gaming system divides the cell value of 1000 by eight (two times the four adjacent cells) and displays the result of 125 in each of the adjacent cells that did not display a value. The gaming system also determines an award based in part on the predefined rule and provides the determined award. That is, the gaming system divides the value of 1000 by two and provides an award of 500 to the player. The gaming system adds the award of 500 to the previous award provided of 125 for a total award of 625, as indicated by the total award won display 108.

For each cell adjacent to the selected cell which displays a value, the gaming system distributes a portion of the value associated with the selected cell to the displayed value according to the predefined rule and displays the value resulting from the distribution. Here, the player selected a cell with two adjacent cells that display a value (i.e., cell C displayed the value 63 and cell K displayed the value 62, as seen in FIG. 7B). In this case, there are four cells adjacent to the selected cell which have not been selected and the value associated with the cell is 1000. Accordingly, the gaming system divides the cell value of 1000 by eight (two times the four adjacent cell values) to result in 125. The gaming system adds the value of 125 to the displayed values of 63 and 62 to result in 188 and 187 respectively. The gaming system displays the values of 188 and 187 in the adjacent cells and adds the value of 125 to the displayed value of 63 and the displayed value of 62. The gaming system displays a suitable message 114 of, "YOU SELECTED CELL G. A PORTION OF THE VALUE ASSOCIATED WITH CELL G HAS BEEN DISTRIBUTED TO EACH ADJACENT CELL. YOU WIN AN AWARD OF 500 ADDITIONAL CREDITS. YOU HAVE TWO SELECTIONS REMAINING."

Figure 7D:
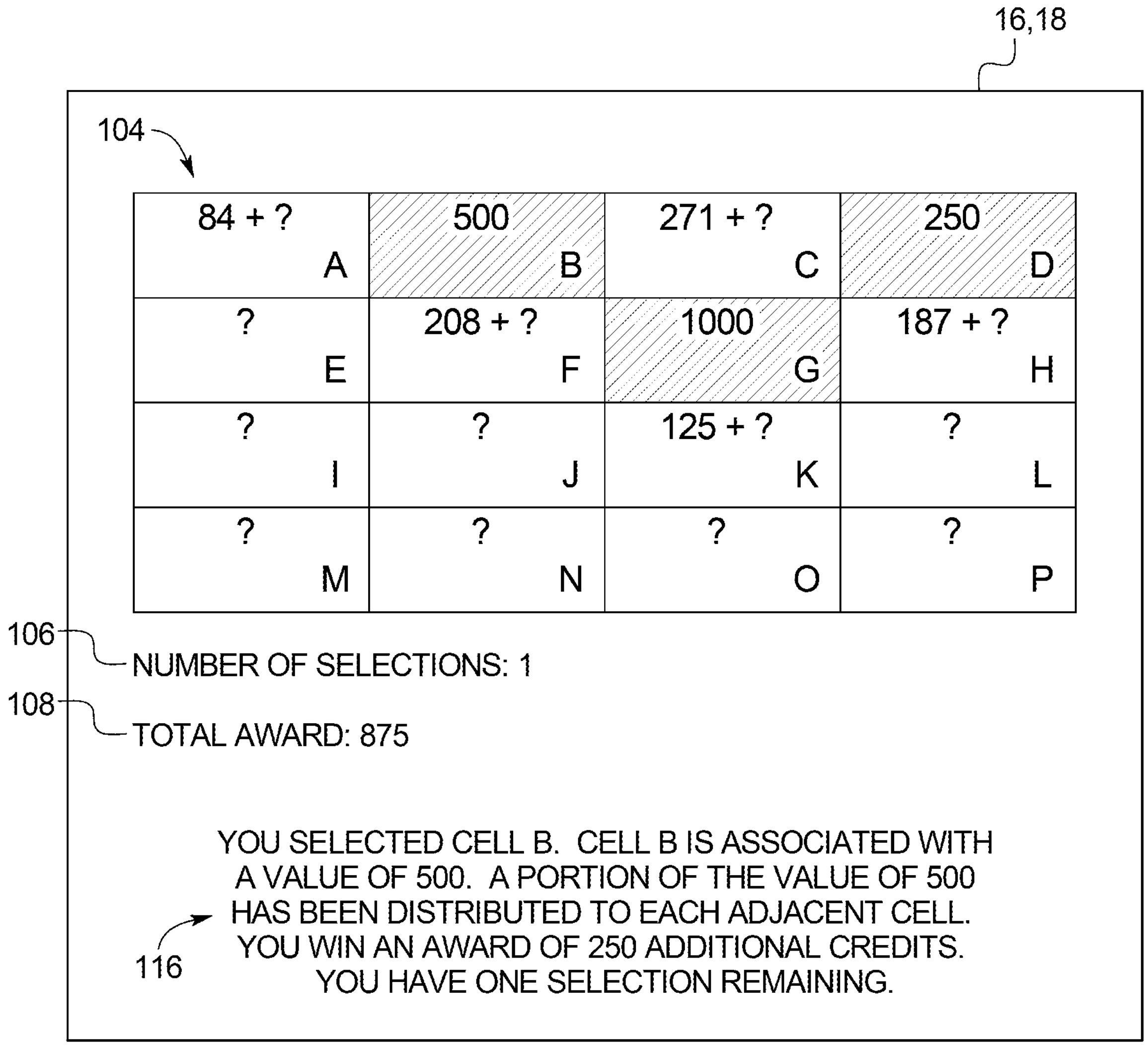

At this point, the gaming system offers the player another interesting decision. If the player selects the cell with the displayed value of 188+?, the player knows the gaming system will provide an award of at least 94. As illustrated in FIG. 7D, the player instead decides to select the cell to the left of the cell with the displayed value of 188+?, which is defined by the intersection of the second column and the first row and does not display a value.

FIG. 7D illustrates the result of the player selecting cell B. The selection of cell B causes the gaming system to mask cell B to indicate the cell has been selected and to change the number of selections displayed in the selections remaining display 106 to one, indicating the player has only one selection remaining in the game. For each cell adjacent to the selected cell which does not display a value, the gaming system distributes a portion of the value associated with the selected cell to each adjacent cell which has not been selected according to the predefined rule, and displays the value resulting from the distribution in each of the adjacent cells. In this case, there is only one cell adjacent to the selected cell which does not display a value (i.e., cell B, as seen in FIG. 7C), and the value associated with the selected cell is 500. Accordingly, the gaming system divides the cell value of 500 by six (two times the three adjacent cells) and displayed the result of 84 (rounded since the result was not a whole number) in the adjacent cell that did not display a value. The gaming system also determines an award based in part on the predefined rule and provides the determined award. That is, the gaming system divides the value of 500 by two and provides the award of 250 to the player. The gaming system adds this award of 250 to the previous total award of 625 for a new total award of 875, as indicated by the total award won display 1088.

For each cell adjacent to the selected cell which displays a value, the gaming system distributes a portion of the value associated with the selected cell to the displayed value according to the predefined rule and displays the value resulting from the distribution. Here, the player selects a cell with two adjacent cells that display a value (i.e., cell F displays the value 125 and cell C displays the value 62, as seen in FIG. 7C). In this case, there are three cells adjacent to the selected cell which have not been selected and the value associated with the selected cell is 500. Accordingly, the gaming system divides the cell value of 500 by six (two times the three adjacent cell values) to result in 83. The gaming system adds the value of 83 to the displayed values of 188 and 125 to result in 271 and 208. The gaming system displays the values of 271 and 208 in the adjacent cells. The gaming system displays a suitable message 116 of, "YOU SELECTED CELL B. CELL B IS ASSOCIATED WITH A VALUE OF 500. A PORTION OF THE VALUE OF 500 HAS BEEN DISTRIBUTED TO EACH ADJACENT CELL. YOU WIN AN AWARD OF 250 ADDITIONAL CREDITS. YOU HAVE ONE SELECTION REMAINING."

At this point, the displayed matrix includes a cell wherein each cell adjacent to the cell has already been selected by the player. That is, cells B and D adjacent to cell C have already been selected, as seen in FIG. 7D. The player is thus provided with another interesting decision. If the player selects cell C, the player knows that because cells B and D have already been selected that the gaming system will provide an award of at least 271 plus whatever value is associated with cell C. In this example, the player decides to select cell C.

Figure 7E:
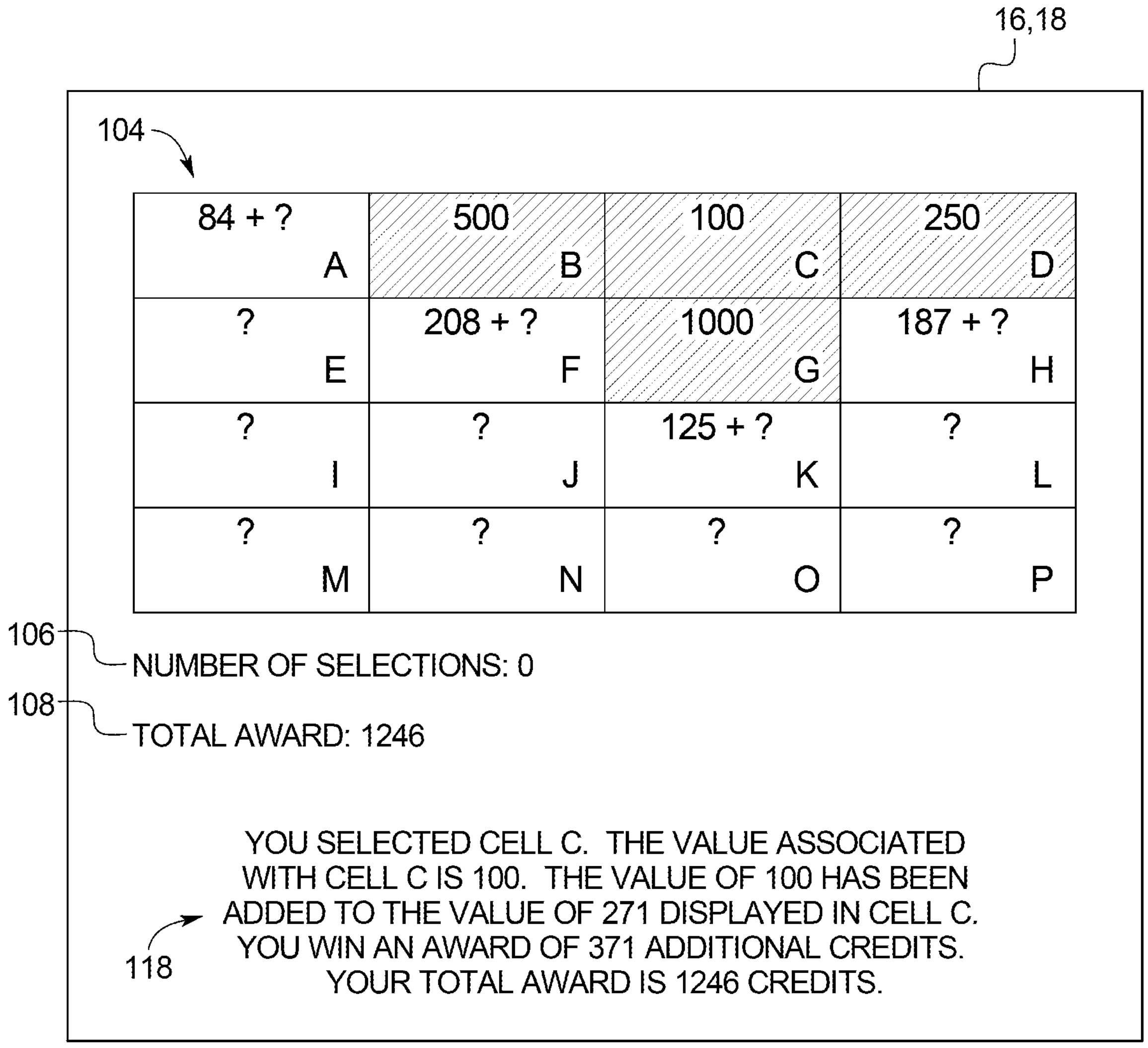

FIG. 7E illustrates the result of the player selecting this cell. The player selects cell C and the value associated with the cell is 100. Because there are no cells adjacent to the selected cell C which have not been selected, the gaming system does not make a distribution. Instead, the gaming system provides an award of 271 plus the value associated with the cell of 100 for a total award of 371. The gaming system adds this award of 371 to the previous award total of 875 for a new total award of 1246, as indicated by the total award won display 108. The gaming system displays a message 92 of "YOU SELECTED CELL C. THE VALUE ASSOCIATED WITH CELL C IS 100. THE VALUE OF 100 HAS BEEN ADDED TO THE VALUE OF 271 DISPLAYED IN CELL C. CONGRATULATIONS! YOU WIN AN AWARD OF 371 ADDITIONAL CREDITS. YOUR TOTAL AWARD IS 1246 CREDITS."

It should be appreciated that in various alternative embodiments, the displayed arrangement of values or cells could be any suitable arrangement such as a circle, a wheel, a triangle, a hexagon, a honeycomb, a checkered pattern, any tessellation, or any suitable polygonal shape. In various embodiments, the displayed arrangement is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria. In one embodiment, the gaming system enables the player to select the displayed arrangement.

It should be appreciated that in various embodiments, the number of displayed cells could be any suitable number of cells. In an embodiment, the number of displayed cells is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria. In one embodiment, the gaming system enables the player to select the number of cells.

It should further be appreciated that the determination of which values are associated with each of the cells could be determined in any suitable manner which enables the gaming system to distribute a portion of a selected value or cell to other values or cells. In an embodiment, the determination of which values are associated with which cells is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

It should be appreciated that the predefined rule could be any suitable rule or set of rules which require the gaming system to distribute at least a portion of a selected value, or value associated with a cell, to any suitable number of other values or cells. In one embodiment, the predefined rule requires the gaming system to distribute an entire selected value to other values or cells. In another embodiment, the predetermined rule requires the gaming system to distribute any percentage or multiplier of the selected value to other values or cells. In another embodiment, the predetermined rule requires the gaming system to randomly determine an amount of the selected cell that will be distributed to other values or cells.

In various alternative embodiments, the predetermined rule requires the gaming system to distribute any portion of the selected value to any suitable number of the other values or cells rather than to each of the adjacent values or cells. For example, the predefined rule could require the gaming system to distribute any portion of the selected value or cell value to the value(s) or cell(s): (i) to the left of the selected value or cell; (ii) to the right of the selected value or cell; (iii) above the selected value or cell; (iv) below the selected value or cell; (v) above and below the selected value or cell; (vi) to the right and left of the selected cell value or cell; (vii) to one or more of the cells or cell values which are directly diagonal to the selected cell or value; (viii) any cell which is a predetermined number of cells to the left or right of the selected cell or value; (ix) any cell which is a predetermined number of cells above and below the selected cell or value; (x) to a predetermined number of columns and/or rows; (xi) to each cell above, below, left, right and diagonal to the selected cell; (xii) to each cell that has not been selected; (xiii) to a randomly determined number of cells; (xiv) to any number of cells which form a particular pattern or shape such as a triangle, square, rectangle, circle or any other suitable polygon; or (xv) any suitable combination thereof. In an alternative embodiment, the gaming system enables the player to select the cell or cells in which to distribute any portion of the selected value.

In various other embodiments, in addition to associating a value with each cell, the gaming system associates an attribute or designated event with one or more of the cells. If a value associated with a selected cell is distributed to a cell associated with a designated event, the gaming system causes the designated event to occur. In one embodiment, the designated event causes the gaming system to automatically distribute the entire value associated with the cell associated with the designated event to other cells as if the cell with the designated event was the cell that was selected by a player. For example, if a player selects cell A and cell A is adjacent to cell B (which is associated with a designated event) the gaming system distributes at least a portion of the value associated with cell A to cell B and causes the designated event to occur. In another embodiment, instead of distributing at least a portion of the value associated with the cell having the designated event, the designated event causes the gaming system to distribute at least a portion of the value associated with the cell that was selected to cells adjacent to the cell associated with the designated event. For example, if a player selects cell A and cell A is adjacent to cell B (which is associated with a designated event) the gaming system distributes at least a portion of the value of cell A to each cell adjacent to cell B. That is, if a player selects cell A, instead of distributing at least a portion of the value associated with cell B, the gaming system causes at least a portion of the value of cell A to be distributed to each cell adjacent to cell B. Thus, the value associated with cell B remains the same. It should be appreciated that in various embodiments in which one or more cells are associated with a designated event, the designated event causes the gaming system to make multiple distributions, (i.e., a chain reaction of distributions). For example, if the gaming system distributes a portion of a selected value to a cell with a first designated event, the first designated event causes the gaming system to distribute a portion of the value associated with the cell having the first designated event to another cell having a second designated event. The second designated event causes the gaming system to distribute a portion of the value associated with the cell having the second designated event to another cell, etc.

It should be appreciated that while the above illustrated embodiment shows one value associated with each cell, in alternative embodiments one or more of the cells can be associated with a plurality of values and/or a plurality of awards. If a player selects such a cell, the gaming system can distribute the values or awards to the same cells or to different cells which have not been selected.

In one such embodiment, the gaming system associates one or more cells with a plurality of values that are the same. In one embodiment, if the player selects a cell with a plurality of values that are the same, the gaming system distributes at least a portion of one of the plurality of values to each adjacent cell that has not been selected. In another embodiment, the gaming system distributes at least a portion of each of the plurality of same values to each adjacent cell that has not been selected.

In another such embodiment, the gaming system associates one or more cells with a plurality of different values. In one embodiment, if the player selects a cell with a plurality of different values, the gaming system distributes at least a portion of one of the plurality of different values to each adjacent cell that has not been selected. The gaming system randomly determines which one of the plurality of different values to distribute. In another embodiment, the gaming system distributes at least a portion of each of the plurality of different values associated with that cell to each adjacent cell that has not been selected.

In another such embodiment, the gaming system associates one or more cells with a plurality of awards, such as a number of free activations, a bonus game opportunity, or physical prizes. In an embodiment, the plurality of awards are the same. In one embodiment, if the player selects a cell with a plurality of the same awards, the gaming system distributes one of the plurality of same awards to each adjacent cell that has not been selected. In another embodiment, the gaming system distributes each of the plurality of same awards to each adjacent cell that has not been selected.

In another such embodiment, the gaming system associates one or more cells with a plurality of different awards. In an embodiment, if the player selects a cell with a plurality of different awards, the gaming system distributes one of the plurality of different awards to each adjacent cell which has not been selected. The gaming system randomly determines which one of the plurality of different awards to distribute. In different embodiments, if the player selects a cell with a plurality of different awards, the gaming system distributes each of the plurality of different awards to each adjacent cell that has not been selected.

In various other embodiments, the gaming system associates one or more cells with at least one award (such as a number of free activations, a bonus game opportunity, or physical prizes) and with at least one value. It should be appreciated that in these embodiments, if a player selects a cell associated with the at least one award and at least one value, the gaming system could distribute the awards or values in any manner described above.

In other such embodiments, the gaming system associates at least one award with one or more cells and determines whether any of the adjacent cells include the same award type as the at least one award associated with the cell that was selected. If the gaming system determines that any of the adjacent cells includes the same award type as the at least one award associated with the selected cell, the gaming system distributes the at least one award to those cells. For example, if a player selects cell A and cell A is associated with an award of a number of free activations and the gaming system determines that cell B (which is adjacent to cell A) is also associated with an award of a number of free activations, then the gaming system distributes or adds the number of free activations of cell A to the number of free activations of cell B. It should be appreciated that in various embodiments, the gaming system determines a plurality of adjacent cells are associated with the same award type as the at least one award associated with the selected cell. For example, if a player selects cell A and cell A is associated with an award of 10 free activations and the gaming system determines that cell B and cell E (which are both adjacent to cell A) are each associated with an award of a number of free activations, then the gaming system distributes or adds the number of free activations of cell A to the number of free activations of cell B and to the number of free activations of cell E. It should be appreciated that in various embodiments, the gaming system distributes only a portion of the at least one award associated with the selected cell to one or more adjacent cells associated with the same award type. For example, if a player selects cell A and cell A is associated with an award of 10 free activations, the gaming system distributes only a portion of the 10 free activations (such as 5 free activations) to one or more adjacent cells with the same award type.

In various alternative embodiments, the gaming system may provide an award in any suitable manner. In one embodiment, instead of the gaming system randomly picking one of the remaining values after the player makes the defined number of selections and providing an award based on the picked value, the gaming system randomly picks a plurality of the remaining values that have not been selected and provides an award to the player based on the plurality of randomly picked values. In another embodiment, instead of randomly picking a value from the remaining values after the player makes the defined number of selections, the gaming system randomly picks any number of the displayed values after any number of selections made by the player. In one such embodiment, the gaming system randomly selects any number of the values that have not been selected after: (i) each player selection (ii) each gaming system selection; or (iii) after each player and each gaming system selection, and provides an award to the player based on each random selection. It should be appreciated that any of the awards provided in any embodiment disclosed herein can be any suitable award such as: (i) a number of credits; (ii) a number of free games; (iii) a number of activations or play of a bonus game; (iv) a number of selections for a game; (v) player tracking points; (vi) money, or (vii) any combination thereof.

In another embodiment, the gaming system provides a player with any suitable number of selections of values, or selections of cells associated with values, instead of the four selections, as illustrated and described in the above embodiments. In various embodiments, the number of selections a player is able to make is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In another embodiment, instead of the player selecting all of the displayed values in the arrangement, both the gaming system and the player select a designated number of the displayed values. In one such embodiment, the gaming system may select half of the defined number of value or cell selections and the player may select the other half of the defined number of value or cell selections. In various embodiments, the determination of the number of values or cells selected by both the gaming system and the player is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system selects each of the displayed values in the arrangement. In one such embodiment, the gaming system displays a wheel arrangement in which the wheel is divided into a predetermined number of sections or cells. Each section or cell on the wheel is associated with a value. The gaming system provides the player with a designated number of spins on the wheel. For each spin of the wheel, the gaming system randomly determines a section or cell of the wheel to indicate, and stops the wheel from spinning to indicate that section or cell. At least a portion of the value associated with the indicated section or cell of the wheel is distributed to a plurality of the other values which have not been selected or indicated according to a predefined rule, which requires the gaming system to distribute a portion of the selected value to each of the values associated with the adjacent sections or cells of the wheel. In one embodiment, for each spin of the wheel, the gaming system also provides an award to the player based at least in part on the value associated with the wheel and according to the predefined rule. After the player spins the wheel the predetermined number of times, the gaming system randomly picks at least one of the remaining values of the wheel which have not been indicated and provides an award to the player based at least in part on the at least one randomly picked value.

In one such embodiment in which the gaming system selects each of the values displayed on a wheel, at least one of the sections of the wheel includes a progressive award. If the gaming system spins the wheel and indicates the section of the wheel associated with the progressive award, the gaming system awards the player the progressive award. At least a portion of a reset value associated with the progressive award is distributed to the values associated with each of the adjacent sections or cells of the wheel according to a predefined rule.

In various alternative embodiments, the gaming system enables a number of players to play a game. In one such embodiment, the gaming system displays a same arrangement of values to each player and enables a defined number of sequential selections of the values to be received from each of the players. Once a player selects one of the values, that value is no longer available for selection. For each player selection of a value, the gaming system distributes a portion of the selected value to a designated number of the other values which have not been selected. After receiving the determined number of selections, the gaming system randomly picks one of the remaining values which have not been selected. The gaming system then determines an award based on the randomly picked value and provides the award to each of the players.

In another such multi-player embodiment, the gaming system displays a same arrangement of values to each player and receives a defined number of simultaneous selections of one of the values from each of the players. In this embodiment, each player can select the same value. Once a value is selected, that value is no longer available for selection. For each player selection of a value, a portion of the selected value is distributed to a designated number of the other values which have not been selected according to a predefined rule. After a designated number of simultaneous player selections of one of the displayed values, the gaming system randomly picks one of the remaining values which have not been selected. The gaming system determines an award based on the randomly picked value and provides the award to each of the players.

In another multi-player embodiment, the gaming system displays an arrangement, or matrix, of a plurality of selectable values for each gaming device, and determines an adjacency matrix for each displayed arrangement of player selectable values. The gaming system enables each player to make a defined number of selections of values in their respective arrangement, or matrix. For example, the gaming system receives a selection of one of the selectable values of a first matrix of a first one of the gaming from a player. For each of a designated number of selectable values of the first matrix of the first gaming device, the gaming system distributes a portion of the selected value according to a predefined rule. For each of a designated number of selectable values of a second matrix of a second gaming device, the gaming system distributes a portion of the selected value according to the predefined rule and the determination of the adjacency matrix. After receiving a defined number of selections of values from each of the gaming devices, for each matrix of each gaming device, the gaming system randomly picks a designated number of the values of the that matrix which have not been selected, determines an award based on the designated number of randomly picked selections, and provides the determined award. It should be appreciated that while the above embodiment determines an award (or a plurality of awards) for each player based on the value or values randomly selected on that respective player's matrix, in other embodiments, the gaming system randomly determines an award (or a plurality of awards) for each player based on the value or values randomly selected on any of the other player's matrices.

The gaming system determines the adjacency matrix by determining the order in which each arrangement, or matrixes, of values will be displayed. For example, if the gaming system includes four gaming devices, designated as gaming devices A, B, C and D, the gaming system could display the four different displayed arrangements in 24 different orders. Thus, it should be appreciated that the number of different possible determinations for an adjacency matrix in an embodiment with X number of gaming devices is equal to X factorial.

In one such embodiment with gaming devices designated as A, B, C and D, if the determination of the adjacency matrix is the order of A, C, D and B, then a selection of a value from the displayed arrangement of A is distributed to the values in the displayed arrangement of C, and to the values in the displayed arrangement of B. The selection of a value from the arrangement of C is distributed to the values in the displayed arrangement of A and to the values in the displayed arrangement of D, . . . etc.

In various embodiments, the gaming system maintains a plurality of progressive awards. In one such embodiment, the gaming system displays a particular arrangement of values wherein one or more of the values are progressive award values. The gaming system enables a player to make a defined number of sequential selections of the values displayed in the particular arrangement. For each player selection, the gaming system distributes at least a portion of the selected value to other values according to one or more predefined rules. After the defined number of player selections of values, the gaming system randomly selects one of the remaining displayed values that have not been selected and provides an award to the player based on the randomly selected value.

In one such embodiment, the gaming system enables the player to sequentially select four of the displayed values, as illustrated by FIGS. 8A and 8B. Similar to the embodiment illustrated by the examples of FIGS. 3A to 3F, 4A to 4F and 5A to 5F, in this embodiment, the gaming system displays on display device 16, 18 an arrangement 60 of player selectable values 62. The displayed arrangement 60 is a matrix having four rows and four columns. The intersection of each row and each column defines individual cells A to P. Each displayed value is associated with one of the individual cells A to P. Cells A, F, I, J, O and P are each associated with a progressive award value. The progressive award values associated with cells A, F, I, J and O are also displayed in table 122, which illustrates a multi-level progressive configuration. Each progressive award value in the multi-level progressive configuration is associated with one of the progressive award values displayed in the matrix. The gaming system also displays the number of selections of values the player is able to make in the game, as seen by the selections remaining display 64 in the lower left hand corner of the display device 16, 18. The gaming system also displays a suitable visual prompt, or message, to begin the game, such as message 120 of, "PLEASE SELECT A FIRST AWARD VALUE. YOU WILL BE ABLE TO SEQUENTIALLY SELECT A TOTAL OF FOUR AWARD VALUES. FOR EACH SELECTION OF AN AWARD VALUE, A PORTION OF THE AWARD VALUE WILL BE DISTRIBUTED TO EACH ADJACENT AWARD VALUE."

FIG. 8B illustrates the gaming system displaying the result of the player selecting the progressive award value of 40.24 associated with cell J. The selection of the value 40.24 causes the gaming system to mask cell J and to mask the progressive award value 40.24 and its associated level in Table 122 to indicate the value 40.24 has been selected. The gaming system also changes the number of selections displayed in the selections remaining display 64 to three, indicating the player has only three selections left in the game. The gaming system also displays the result of the distribution of a portion of the selected progressive award value of 40.24 to each of the cell values adjacent to the selected cell value according to a predefined rule, which requires the gaming system to divide the selected cell value by the number of adjacent cell values and add that result to each adjacent cell value. The adjacent cells values are each cell to the left and right of the selected cell value and each cell value above and below the selected cell value. Accordingly, the gaming system divides the selected cell value of 40.24 by the number four, and adds that result to each of the adjacent cell values of F, K, N, and I. The value of 40.24 divided by four results in 10.06, thus the gaming system adds 10.06 to the four cell values adjacent the selected cell value. As seen, the distribution according to the predefined rule results in the display of new values of 110.22, 210.06, 410.06, 100,010.09 in cells F, K, N and I respectively. The gaming system displays a suitable message such as message 124 of, "YOU SELECTED THE PROGRESSIVE AWARD VALUE 40.24. A PORTION OF THE PROGRESSIVE AWARD VALUE OF 40.24 HAS BEEN DISTRIBUTED TO EACH ADJACENT AWARD VALUE. YOU HAVE THREE SELECTIONS REMAINING."

The gaming system then enables the player to make three additional award value selections and proceeds in the same manner as in the embodiment illustrated by the examples of FIGS. 3A to 3F, 4A to 4F and 5A to 5F. That is, after the player makes the fourth and final value selection, the gaming system randomly selects one of the remaining displayed values that have not been selected and provides an award to the player based on the randomly selected value.

In another embodiment, the gaming system displays a particular arrangement of values wherein each of the displayed values are progressive award values, as illustrated by FIGS. 9A to 9B. Similar to the embodiment illustrated by the examples of FIGS. 3A to 3F, 4A to 4F and 5A to 5F, and 8A to 8F, in this embodiment, the gaming system displays on display device 16, 18 an arrangement 60 of player selectable values 62. Here each of the player selectable values 62 are progressive award values. The displayed arrangement 60 is a matrix having four rows and four columns. The intersection of each row and each column defines individual cells A to P. Each displayed progressive award value is associated with one of the individual cells A to P. The progressive award values associated with cells A to P are also displayed in a table 123, which illustrates a multi-level progressive configuration. Each progressive award value in the multi-level progressive configuration is associated with one of the progressive award values displayed in the matrix. The gaming system also displays the number of selections of progressive award values the player is able to make in the game, as seen by the selections remaining display 64 in the lower left hand corner of the display device 16, 18. The gaming system also displays a suitable visual prompt, or message, to begin the game, such as message 126 of, "PLEASE SELECT A FIRST PROGRESSIVE AWARD VALUE. YOU WILL BE ABLE TO SEQUENTIALLY SELECT A TOTAL OF FOUR PROGRESSIVE AWARD VALUES. FOR EACH SELECTION OF A PROGRESSIVE AWARD VALUE, A PORTION OF THE SELECTED PRO- GRESSIVE AWARD VALUE WILL BE DISTRIBUTED TO EACH ADJACENT PROGRESSIVE AWARD VALUE."

FIG. 9B illustrates the gaming system displaying the result of the player selecting the progressive award value #5 of 40.24 in cell J. The selection of the value 40.24 causes the gaming system to mask cell J to indicate the value 40.24 has been selected and to change the number of selections displayed in the selections remaining display 64 to three, indicating the player has only three selections left in the game. Upon selection of the progressive award value #5 of 40.24 in cell J, the gaming system causes the progressive award value #5 associated with cells B, G and P to be reset to a value of 40.00. The gaming system also displays the result of the distribution of a portion of the selected progressive award value of 40.24 to each of cell values adjacent to the selected cell value according to a predefined rule, which requires the gaming system to divide the selected cell value by the number of adjacent cell values and add that result to each of the adjacent cell values. The adjacent cell values are each cell value to the left and right of the selected cell value and each cell value above and below the selected cell value.

Accordingly, the gaming system divides the selected cell value of 40.24 by the number four, and adds that result to each of the adjacent cell values of F, K, N, and I. The value of 40.24 divided by four results in 10.06. In this case, there are two progressive award values associated with level #6 of 20.50 that are displayed in the matrix, i.e., the values associated with cells N and I. Accordingly, the gaming system adds 10.06 to the adjacent progressive award value associated with cell N to result in a value of 30.56, which causes the gaming system to also add 10.06 more to the progressive award value #6 associated with each of cells A, D, I, and L. The gaming system also adds 10.06 to the other adjacent progressive award value #6 associated with cell I (which is now a value of 30.56) to result in a value of 40.62, which causes the gaming system to also add 10.06 to the progressive award value #6 associated with each of cells A, D, N and P.

The gaming system also adds 10.06 to the other adjacent progressive award values associated with cells F and K. Accordingly, the gaming system adds 10.06 to the adjacent progressive award value #3 associated with cell K to result in a value of 510.18, which causes the gaming system to also add 10.06 to the progressive award value #3 associated with cell E. The gaming system also adds 10.06 to the adjacent progressive award value #4 associated with cell F to result in a value of 110.22, which causes the gaming system to add 10.06 to the progressive award value #4 associated with cells H and O.

Accordingly, the distribution according to the predefined rule results in the display of new values of 40.62, 40.62, 510.18, 110.22, 110.22, 40.62, 510.18, 40.62 and 40.62 in cells A, D, E, F, H, I, K, L and N respectively. The gaming system displays a suitable message such as message 124 of, "YOU SELECTED THE PROGRESSIVE AWARD VALUE 40.24. A PORTION OF THE PROGRESSIVE AWARD VALUE OF 40.24 HAS BEEN DISTRIBUTED TO EACH ADJACENT PROGRESSIVE AWARD VALUE. YOU HAVE THREE SELECTIONS REMAINING."

The gaming system then enables the player to make three additional progressive award value selections and proceeds in the same manner as discussed above and in accordance with embodiment illustrated by the examples of FIGS. 3A to 3F, 4A to 4F, 5A to 5F and 8A to 8B. That is, after the player makes the fourth progressive award value selection, the gaming system randomly selects one of the remaining displayed progressive award values that have not been selected and provides an award to the player based on the randomly selected progressive award value.

General Progressive Distribution Embodiment

In one embodiment, instead of the gaming system displaying a plurality of values in a matrix or in cells and enabling the player to select one of the displayed values, the gaming system maintains a plurality of progressive awards in a multi-level progressive configuration. Upon a suitable progressive award bonus triggering event, the gaming system enables a player to play for a first one of a plurality of progressive awards in the bonus event. The gaming system then determines whether to advance the player to play for a second subsequent award of a second subsequent progressive award level. If the gaming system determines that the player does not advance to play for a second subsequent progressive award of a second subsequent progressive award level (i.e., the gaming system determines to provide the player with the first one of the progressive awards), the gaming system provides the first one of the progressive awards to the player and the progressive award bonus event ends. If the gaming system determines that the player advances to play for a second subsequent progressive award of a second subsequent progressive award level (i.e., the gaming system determines not to provide the first one of the progressive awards to the player), the gaming system distributes at least a portion of the value of the first one of the progressive awards to one or more of the remaining progressive awards as described in more detail below.

As mentioned above, in one embodiment, upon triggering the bonus event, one of the players at one of the gaming devices in the gaming system is selected to participate in the bonus event. In different embodiments, the player at one of the gaming devices selected to participate in the triggered bonus event is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In one embodiment, the triggered bonus event includes a bonus or secondary game or sequence. In the triggered bonus event, the central controller and/or gaming device processor determines which one of the progressive awards of the MLP to provide to the player (as described in more detail below) and provides the player the determined progressive award.

Figure 10:
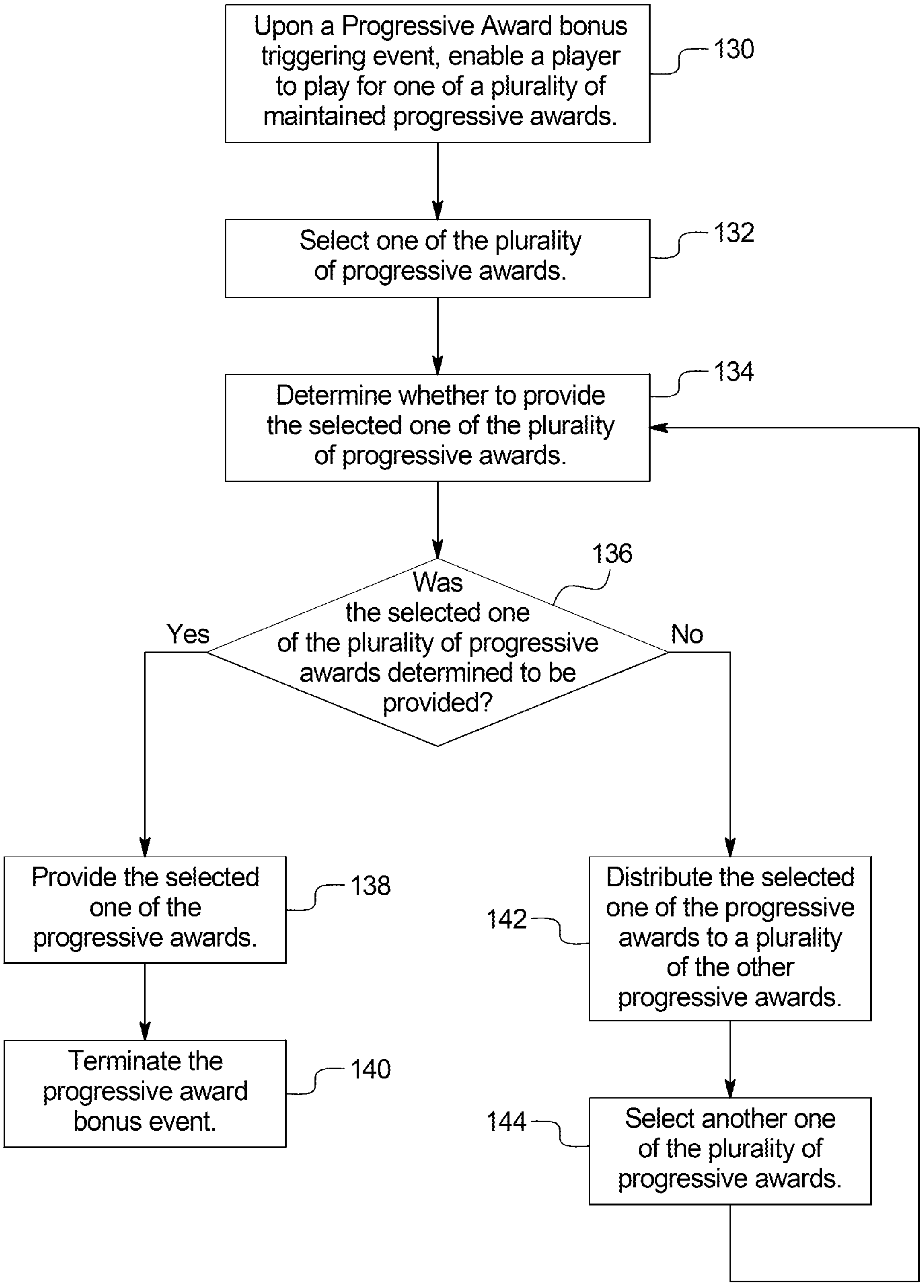
FIG. 10 is a flowchart of one embodiment of the gaming system disclosed herein which enables a player to play for one of a plurality of progressive awards.

Referring to the flow chart of FIG. 10, in one embodiment, upon a progressive award bonus triggering event, the gaming system enables a player to play for one of a plurality of progressive awards in a multi-level progressive configuration as indicated in block 130. In the bonus event, one of the plurality of progressive awards will be provided to the player and the bonus event is utilized to determine which one of the progressive awards to provide to the player. In the bonus event, the gaming system first selects one of a plurality of progressive awards as indicated in block 132. In one embodiment, the gaming system selects the progressive award associated with the lowest level of the multi-level progressive configuration. In another embodiment, the gaming system randomly selects a progressive awards associated with any one of levels of the multi-level progressive configuration.

The gaming system then determines whether to provide the selected one of the plurality of progressive awards to the player as indicated in block 134. The gaming system then determines whether the selected one of the plurality of progressive awards was provided to the player as indicated in block 136. If the determination is to provide the selected one of the plurality of progressive awards to the player, the gaming system provides the award to the player as indicated in block 138 and funds the award of the multi-level progressive that was provided to the player with a set value or amount. The gaming system then terminates the progressive award bonus event as indicated in block 140.

If the selected progressive award is not provided to the player, the gaming system distributes the selected one of the plurality of progressive awards to a plurality of the other progressive awards as indicated in block 142. In one embodiment, the gaming system distributes a portion of the selected one of the plurality of progressive awards to each of the other progressive awards. In another embodiment, the gaming system distributes a portion of the selected one of the plurality of progressive awards to each of a plurality of the other progressive awards (i.e., less than all of the other progressive awards). For example, in one embodiment, the gaming system distributes a portion of the selected one of the progressive awards only to the two highest levels of the multi-level progressive configuration. In various embodiments, the determination of which of the plurality of other progressive awards to distribute the portion of the selected one of the progressive awards is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In one embodiment, the portion of the selected progressive award that is distributed to a plurality of the other progressive awards is the same. In another embodiment, the portion of the selected progressive award that is distributed to a plurality of the other progressive awards is different. For example, in one embodiment, the higher levels of the multi-level progressive configuration receive a higher percentage of the portion of the selected progressive award value than the lower levels. In various embodiments, the portion of the selected progressive award that is that is distributed to a plurality of other awards is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria. The gaming system then selects another one of the plurality of progressive awards as indicated in block 144.

Figure 11:
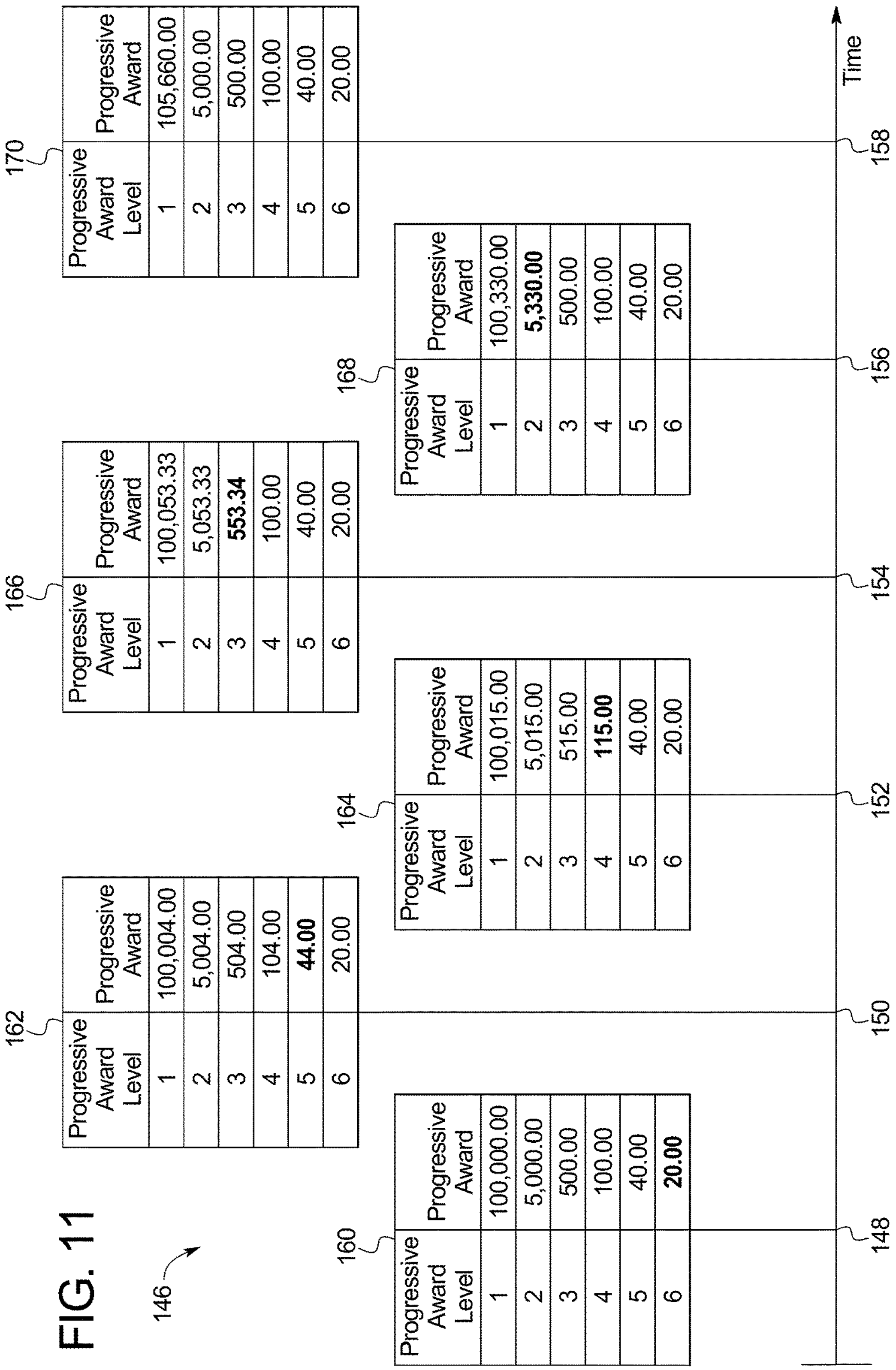
FIG. 11 is a timeline illustrating one example embodiment of a game in which a player advances through different progressive award levels in a multi-level progressive configuration.

FIG. 11 is a timeline 146 illustrating one example embodiment of the gaming system enabling a player to advance to higher levels of the multi-level progressive configuration in the progressive award bonus event, and of the gaming system distributing the progressive award value from each of the lower levels from which the player advanced to the progressive award values associated with the other higher levels. At a first point in time 148 of timeline 146, the player enters the bonus event at the lowest level (i.e., level six) of the multi-level progressive configuration as shown in the Table 160. At a second point in time 150, the gaming system determines to advance the player to level five in the multi-level progressive configuration. The gaming system distributes the progressive award value associated with level six to the progressive award values associated with each of the higher progressive award levels as shown in Table 162. That is, the gaming system divides the progressive award value of 20.00 by the number of higher progressive award levels of five to result in a value of 4. The gaming system adds this result of four to each of the five progressive award values associated with the higher progressive award levels to result in new progressive award values of 44, 104.00, 504.00, 5004.00, 100,0004.00 associated with the progressive award levels of one to five respectively.

At a third point in time 152, the gaming system determines to advance the player to level four in the multi-level progressive configuration. The gaming system distributes the progressive award value associated with level five to the progressive award values associated with each of the higher progressive award levels as shown in Table 164. That is, the gaming system divides the progressive award value of 44.00 by the number of higher progressive award levels of four to result in a value of 11. The gaming system adds this result of eleven to each of the four progressive award values associated with the higher progressive award levels to result in new progressive award values of 115.00, 515.00, 5015.00, 1000, 015.00 associated with the progressive award levels of one to four respectively.

At a fourth point in time 154, the gaming system determines to advance the player to level three in the multi-level progressive configuration. The gaming system distributes the progressive award value associated with level four to the progressive award values associated with the higher progressive award levels as shown in Table 166. That is, the gaming system divides the progressive award value of 115.00 by the number of higher progressive award levels of three. Dividing the number 115.00 by three does not result in a whole number. Thus, the gaming system adds 38.34 to the progressive award value associated with the third progressive award level and 38.33 to the progressive award value associated with each of the first and second progressive award levels resulting in new progressive award values of 553.34, 5053.33, and 100,053.33 associated with the progressive award levels of one to three respectively.

At a fifth point in time 156, the gaming system determines to advance the player to level two in the multi-level progressive configuration. The gaming system distributes the progressive award value associated with level three to the progressive award values associated with higher progressive award levels as shown in Table 168. That is, the gaming system divides the progressive award value of 553.34 by the number of higher progressive award levels of two resulting in 276.67. Thus, the gaming system adds 276.67 to the progressive award values associated with each of the first and second progressive award levels resulting in new progressive award values of 5330.00, and 100,330.00 associated with the progressive award levels of one and two respectively.

At a sixth point in time 158, the gaming system determines to advance the player to the highest level (i.e., level one) in the multi-level progressive configuration. The gaming system distributes the progressive award value associated with level two to the progressive award value associated with the highest progressive award level as shown in Table 170. That is, the gaming system divides the progressive award value of 5330.00 by the number one resulting in 5330.00. Thus, the gaming system adds 5330.00 to the progressive award value associated with the first progressive award level resulting in a new progressive award value of 105,660.00 associated with the progressive award level one.

To calculate the expected value of each progressive award taking into account the progressive award distribution feature described above, the following equations are utilized:

$$Ai = W * Oi * Ci; \quad (1)$$

$$PBi = Ai + \sum_{j=i+1}^{j=N} PBj * Bj * (Oi/Oj)/(j-1), \quad (2)$$

wherein

N=the number of progressive levels, W=Average Wager, Oi=Odds of hitting progressive level i, Ci=Contribution to progressive level I, Ai=Progressive level i, Average award as a regular progressive, Bi=Probability of distributing progressive award and advancing a level, PBi=Progressive level i, Average award with the Progressive Award Distribution Feature.

It should be appreciated that in a multi-level progressive including the progressive award distribution feature of the present disclosure, the progressive awards increase in value based on both a small percentage of coin-in or wagered amounts and increase in value as the player advances from a lower level of the multi-level progressive to a higher level. That is, in the gaming system including the progressive award distribution feature, each time a player advances a level in the multi-level progressive, at least a portion of the award value associated with the level from which the player advanced is distributed to one or more of the higher level progressive award values. Thus, the average award for the higher levels of the multi-level progressive including the progressive award distribution feature is higher than the average awards for the higher levels in a typical multi-level progressive, as illustrated in Table 172.

More specifically, Table 172 illustrates an example of the odds, average award, contribution percentage and probability of advancing to a higher level for each level of a multi-level progressive having the progressive award distribution feature of the present disclosure relative to a typical multi-level progressive. As seen, in the gaming system having the progressive award distribution feature, the contribution percentage for levels one to four is higher than the contribution percentage for levels one to four in a typical multi-level progressive. Also, in the gaming system having the progressive award distribution feature, the average award is higher for levels one to five than the average awards for levels one to five in a typical multi-level progressive. Thus, it should be appreciated that in the multi-level progressive having a progressive award distribution feature, the lower level values of the multi-level progressive progress, or increases in value, more quickly than they do in a typical multi-level progressive. Additionally, all progressive award levels in the multi-level progressive having a progressive award distribution feature which is, on average, larger than in a typical multi-level progressive. For example, the gaming system having a typical multi-level progressive such as that shown in Table 142 would advertise a total of 105,660 for all progressives awards, while the gaming system including the progressive award distribution feature would advertise a total of 426,055.67 for all progressive awards.

In one embodiment, the bonus event may include one or more of the game play features disclosed herein (or any other suitable game play feature otherwise known) which determine, at least in part, which one of the progressive awards of the MLP to provide to the player. In one embodiment, the bonus event incorporates one or more aspects of player physical skill or mental skill to determine which one of the progressive awards will be provided to the player. In this embodiment, the player begins at the lowest or bottom progressive award level of the MLP and attempts to reach a higher progressive award level, based at least in part on their level of skill or strategy in the bonus event. In different embodiments, the bonus event may be any suitable type of single or multi-round game including, but not limited to, reel/slot games, card games (e.g., poker, blackjack), lottery games, selection games, offer and acceptance games, wheel games, dice games, free spin games, competition games and perceived skill games which determine, at least in part, which one of the progressive awards of the MLP to provide to the player.

In one embodiment, if the determination is to provide the selected one of the plurality of progressive awards to the player as indicated in block 138, the gaming system funds the value of the multi-level progressive that was provided to the player with a set value or amount that is the same for a plurality of the bonus events. In another embodiment, the set value or amount is the same for each bonus event. In one embodiment, the set value or amount is different for a plurality of the bonus events. In another embodiment, the set value is different for each bonus event. In different embodiments, the set value is predetermined, randomly determined, determined based on a player's status (determined through a suitable player tracking system), determined based on a random determination by the central controller, determined based on a random determination at the gaming device, determined based on one or more side wagers placed, determined based on the player's primary game wager, determined based on time (such as the time of day) or determined based on any other suitable method or criteria.

In one embodiment, instead of the player having to advance to the next level of the multi-level progressive to distribute a portion of the progressive award to a plurality of the other progressive awards, the gaming system randomly distributes one of the progressive awards to a plurality of the other progressive awards.

In the embodiment shown in FIG. 11, the player begins the progressive award bonus event at the lowest level of the multi-level progressive. It should be appreciated that in different embodiments, the player may begin the bonus event at any one of the higher levels of the multi-level progressive.

In one embodiment, upon the player advancing to the next level in the multi-level progressive, the gaming system provides the player with at least a portion of the progressive award value associated with the level from which the player advanced. In different embodiments, in addition to providing the award associated with the level from which the player advanced, the gaming system distributes at least a portion of the progressive award value associated with the level from which the player advanced to a plurality of the other progressive award values. In one embodiment, the gaming system may distribute the entire amount of the award value to higher levels and provide the entire amount of the award value to the player. In another embodiment, the gaming system distributes only a portion of the award value and provides the player with only a portion of the award value.

In one embodiment, instead of the gaming system distributing a portion of the progressive award level from which the player advanced evenly among a plurality of the other progressive awards, the gaming system distributes a portion of the progressive award level from which the player advanced unevenly among the higher levels. For example, in one embodiment, the gaming system distributes a larger portion of the progressive award value to the next highest progressive award level. It should be appreciated that the distribution of the larger portion of the progressive award value to the next highest level causes a perception of a dramatic increase in the award value for the next highest progressive award level.

In another embodiment, when the player wins a progressive award value associated with a first level of the multi-level progressive, the gaming system provides the player with a choice of keeping the award value or wagering the award value on the next level of the multi-level progressive. If the player chooses to keep the award value, the gaming system terminates the bonus event. If the player chooses to wager on winning the next level, and the player wins the wager, the gaming system provides the progressive award value associated with the next highest level of the multi-level progressive. If the player chooses to wager on winning the next level, and does not win the wager, the gaming system distributes at least a portion of the award value associated with the first level to a plurality of the other higher level progressive aware values. In one embodiment, if the player loses the wager, the gaming system also provides the player with at least a portion of the progressive award value associated with the first level.

In one embodiment, in the progressive award bonus event, the gaming system does not provide the player with one or more of the progressive award values associated with the multi-level progressive. In one embodiment, certain events that occur in the gaming system cause such values to be distributed to other progressive award values.

Triggering Event

In one embodiment, a bonus event (including, but not limited to, the progressive award bonus event) is triggered based on one or more game play events, such as a symbol-driven trigger. In other embodiments, the bonus event is triggered based on exceeding a certain amount of game play (such as number of games, number of credits, or amount of time), or reaching a specified number of points earned during game play.

In one embodiment, the bonus event is randomly triggered or apparently randomly triggered. In one such embodiment, the gaming device does not provide any apparent reasons to the player for triggering the bonus event, wherein triggering the bonus event is not based on any event in any of the plays of any primary games or on any of the plays of any secondary game of the gaming machines in the gaming system. That is, a bonus event is triggered without any explanation or alternatively with simple explanations. In another embodiment, a bonus event is triggered at least partially based on a game event, such as a symbol-driven trigger, and at least partially based on a non-game play, random event.

In one such embodiment, the triggering of the bonus event is randomly determined, wherein different players are assigned different chances of participating in the bonus event based on their respective wager levels. For example, if a first player wagered 500 coins and a second player wagered 225 coins and the chance of participating in the bonus event was 1/20,000, the first player would have a 2.5% (500/20,000) chance of participating in the bonus event while the second player would have a 1.125% (225/20,000) chance of participating in the bonus event.

In at least one embodiment, one of the progressive awards is an accumulated value progressive award. In this embodiment, the triggering of the bonus event occurs based on at least one accumulated value progressive award incremented to a progressive award hit value. In this embodiment, the gaming system includes one or more accumulated value progressive awards or Nth coin progressive awards. Such accumulated value progressive awards are driven by an amount of wagers placed or a suitable coin-in amount. In one such embodiment, each accumulated value progressive award is associated with a range of values, wherein a bonus event will trigger when the progressive award increments to a progressive award hit value within the range of values associated with that progressive award. That is, when an accumulated value progressive award increases to a determined progressive award hit value, a triggering of the bonus event will occur. In different embodiments, the progressive award hit value at which an accumulated value progressive award causes a triggering of the bonus event to occur is predetermined, randomly determined, determined based on the wagers placed in the gaming system, determined based on the status of one or more players (such as determined through a player tracking system), determined based on time, or determined based on any other suitable method. In this embodiment, after the accumulated value progressive award causes a triggering of the bonus event to occur, the accumulated value progressive award is reset to a default value and starts incrementing from the default progressive award level.

In operation of one such embodiment, the central server which hosts one of these accumulated value progressive awards: (1) determines a minimum amount and a maximum amount for the progressive award or prize pool, (2) provides that the progressive award or prize pool starts at the minimum, (3) determines an accumulated value progressive award hit value between the minimum amount and the maximum amount, (4) increments the progressive award or prize pool with a configured percent of coin-in, and (5) causes a triggering of the bonus event to occur when the progressive award or prize pool equals the determined accumulated value progressive award hit value. In this embodiment, the accumulated value progressive award hit value is determined at random to maintain fairness for the players at the gaming devices in the gaming system, wherein the players are not aware of any determined accumulated value progressive award hit value.

In different embodiments, the range of values associated with an accumulated value progressive award is predetermined, randomly determined, determined based on the wagers placed in the gaming system, determined based on the status of one or more players (such as determined through a player tracking system), determined based on time, or determined based on any other suitable method. In one embodiment, a plurality of accumulated value progressive awards are associated with different value ranges. In another embodiment, each of a plurality of accumulated value progressive awards are associated with a different value range. In another embodiment, a plurality of accumulated value progressive awards are associated with the same value range. In another embodiment, the value range associated with an accumulated value progressive award is based on a player's status (via a player tracking system).

In another such embodiment, the triggering of the bonus event is based on time. In this embodiment, a time is set for when a bonus event trigger will occur. In one embodiment, such a set time is based on historic data. For example, if previous bonus event triggers have occurred after approximately sixty-seven hours, a bonus event may be set to trigger sixty-seven hours from the conclusion of the previous bonus event. In one embodiment, a suitable algorithm is implemented to determine the player who wagered at or closest to this time with tie-breaking based on any number of factors (e.g., player tracking history, amount of or recent wagers placed). In this embodiment, the gaming device which the algorithm determined wagered closest to when the bonus event triggered is enabled to participate in the triggered bonus event. In another embodiment, one of the gaming devices which placed a wager during a designated time period is randomly selected and enabled to participate in the triggered bonus event.

In another such embodiment, the triggering of the bonus event is based on a predefined variable reaching a defined parameter threshold. For example, the bonus event is triggered when the 500th different player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that would define a threshold for triggering the bonus event.

In another such embodiment, the triggering of the bonus event occurs after a random number of plays in which a bonus event has not been triggered. In another embodiment, the triggering of the bonus event is based upon gaming system operator defined player eligibility parameters stored on a player tracking system (such as via a player tracking card or other suitable manner). In another embodiment, the triggering of the bonus event is based upon gaming system operator defined player eligibility parameters stored on a player tracking system (such as via a player tracking card or other suitable manner).

In another such embodiment, the triggering of the bonus event includes a system determination which is based on a random selection by the central controller. In one embodiment, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status; (d) the existence of credits on the gaming device may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria).

In one such embodiment, based on the gaming machine's state as well as one or more wager pools associated with the gaming machine, the central controller determines which of these gaming machines is enabled to participate in a triggered bonus event. In one embodiment, the gaming machine which has been classified as active the longest since the last triggering event is enabled to participate in a triggered bonus event. In another embodiment, the determination of which gaming device will play a bonus event is based on the relative proportion of gaming/wagering activity at each gaming device in the gaming system. In this embodiment, the player who consistently places a higher wager is more likely to participate in a bonus event than a player who consistently places a minimum wager.

In one alternative embodiment, a central controller and an individual gaming machine work in conjunction with each other to determine when to trigger each bonus event. In one embodiment, an individual gaming machine may determine when to trigger one or more bonus events. In another embodiment, an individual gaming machine may determine when to trigger at least one bonus event and the central controller determines when to trigger at least one bonus event.

In another embodiment, the central controller determines, in cooperation with the gaming device, when to trigger a bonus event by utilizing one or more random number generators. In this embodiment, the central controller determines when to trigger a bonus event by determining if any numbers allotted to a gaming device match a randomly selected number. In one such embodiment, upon or prior to each play of each gaming machine, a random number is selected from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine triggers a bonus event. It should be appreciated that any suitable manner of triggering the bonus event may be implemented with the gaming system disclosed herein.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention is claimed as follows:

1. A method of operating a system, the method comprising:

separate from any display of any play of any game:

at a first point in time, for each of a plurality of progressive awards, automatically displaying, by a display device, a current value of that progressive award, and at a second, subsequent point in time after a triggering of an event to win at least one of the plurality of progressive awards and responsive to a progressive award distribution event occurring in association with any of the plurality of progressive awards that causes, independent of any user input via any input device, an automatic distribution of an entirety of the current value of that any one of the plurality of progressive awards to at least another one of any of the plurality of progressive awards, and causes, independent of any user input via any input device, a reset of that automatically distributed progressive award to a reset value, for each of the plurality of progressive awards, displaying, by the display device, the current value of that progressive award.

2. The method of claim 1, wherein the progressive award distribution event occurs in association with any of the plurality of progressive awards independent of a determination to provide any of the plurality of progressive awards.

3. The method of claim 1, wherein the automatic distribution comprises different valued portions of the current value of that progressive award to different ones of the plurality of progressive awards.

4. The method of claim 1, wherein the progressive award distribution event randomly occurs in association with any of the plurality of progressive awards.

5. A method of operating a system, the method comprising:

separate from any display of any play of any game:

displaying, by a display device and for each of a plurality of progressive awards, a current value of that progressive award, and after a triggering of an event to win at least one of the plurality of progressive awards:

responsive to a progressive award distribution event occurring in association with a first one of the plurality of progressive awards that causes, independent of any user input via any input device, an automatic distribution of an entirety of the current value of the first one of the plurality of progressive awards to a second, different one of the plurality of progressive awards, displaying, by the display device, a first reset value of the automatically distributed first one of the plurality of progressive awards and the current value of the second, different one of the plurality of progressive awards, and responsive to the progressive award distribution event occurring in association with the second, different one of the plurality of progressive awards that causes, independent of any user input via any input device, an automatic distribution of an entirety of the current value of the second, different one of the plurality of progressive awards to the first one of the plurality of progressive awards, displaying, by the display device, a second reset value of the automatically distributed second, different one of the plurality of progressive awards and the current value of the first one of the plurality of progressive awards.

6. The method of claim 5, wherein the progressive award distribution event occurs in association with the first one of the plurality of progressive awards independent of a determination to provide the first one of the plurality of progressive awards.

7. The method of claim 5, wherein responsive to the progressive award distribution event occurring in association with the first one of the plurality of progressive awards, the automatic distribution comprises different valued portions of the current value of the first one of the plurality of progressive awards to a plurality of different ones of the plurality of progressive awards.

8. The method of claim 5, wherein the progressive award distribution event randomly occurs in association with the first one of the plurality of progressive awards.

* * * * *